US006345760B1

(12) United States Patent
Eason et al.

(10) Patent No.: US 6,345,760 B1
(45) Date of Patent: Feb. 12, 2002

(54) MACHINE FOR PROCESS FOR IC CARDS AND APPARATUS FOR ISSUING IC CARDS

(75) Inventors: Michael Eason; Robert McBeath, both of Tunbridge Wells (GB)

(73) Assignee: Asahi Seiko., Ltd. (JP)

( * ) Notice: Subject to any disclaimer, the term of this patent is extended or adjusted under 35 U.S.C. 154(b) by 0 days.

(21) Appl. No.: 09/321,463

(22) Filed: May 27, 1999

(30) Foreign Application Priority Data

May 28, 1998 (JP) .......................................... 10-186795
Dec. 18, 1998 (JP) .......................................... 10-378148

(51) Int. Cl.⁷ ................................................ G06K 5/00
(52) U.S. Cl. ...................................... 235/380; 235/475
(58) Field of Search ................................ 235/380, 381, 235/479, 480, 475, 477, 483, 484, 485, 435, 439, 441; 198/369.1, 624; 271/302; 705/17, 41

(56) References Cited

U.S. PATENT DOCUMENTS

| | | | |
|---|---|---|---|
| 3,641,497 A | * 2/1972 | Constable .................... 235/382 |
| 3,909,595 A | * 9/1975 | Morello et al. .......... 235/480 X |
| 4,256,299 A | * 3/1981 | Hogenson ................ 271/302 X |
| 4,641,239 A | * 2/1987 | Takesako ................ 235/380 X |
| 4,827,425 A | * 5/1989 | Linden ......................... 364/478 |
| 4,851,651 A | * 7/1989 | Gaucher ..................... 235/380 |
| 4,866,259 A | * 9/1989 | Bonnemoy .................. 235/475 |
| 4,900,906 A | * 2/1990 | Pusic ......................... 235/381 |
| 4,968,873 A | * 11/1990 | Dethloff et al. ............. 235/380 |
| 4,993,587 A | 2/1991 | Abe |
| 5,183,249 A | * 2/1993 | Ichikawa ..................... 271/186 |
| 5,210,616 A | * 5/1993 | Kawasaki et al. ........... 358/296 |
| 5,332,889 A | * 7/1994 | Lundstrom et al. ......... 235/380 |
| 5,378,884 A | * 1/1995 | Lundstrom et al. ......... 235/441 |
| 5,397,426 A | * 3/1995 | Nioche et al. ............... 156/514 |
| 5,410,642 A | * 4/1995 | Hakamatsuka et al. ..... 395/113 |
| 5,440,108 A | * 8/1995 | Tran et al. ................... 235/381 |
| 5,712,472 A | * 1/1998 | Lee .............................. 235/486 |
| 5,729,717 A | * 3/1998 | Tamada et al. .............. 395/491 |
| 5,773,805 A | * 6/1998 | Nakamura et al. .......... 235/441 |
| 5,799,316 A | * 8/1998 | Audren ........................ 707/104 |
| 5,929,414 A | * 7/1999 | Saitoh ......................... 235/380 |
| 5,943,238 A | * 8/1999 | Nioche et al. ......... 364/468.28 |
| 5,959,276 A | * 9/1999 | Iijima .......................... 235/380 |
| 6,186,501 B1 | * 2/2001 | St. Ours ...................... 271/302 |

FOREIGN PATENT DOCUMENTS

| | | | |
|---|---|---|---|
| DE | 197 28 011 | * 1/1999 | .......... G06F/17/60 |
| EP | 0 311 119 | 4/1989 | |
| EP | 0 429 976 | 6/1991 | |
| EP | 0 528 275 | 2/1993 | |
| EP | 0 774 732 | 5/1997 | |
| JP | 1-164246 | 11/1989 | |
| JP | 7-26276 | 6/1995 | |
| JP | 10-134231 | 5/1998 | |
| WO | WO 97/22919 | 6/1997 | |

OTHER PUBLICATIONS

Yoshiyuki Koboi et al., Card Issuing Machine, May 22, 1998, translation of the abstract of JP 10–134231 A.*

* cited by examiner

Primary Examiner—Michael G. Lee
Assistant Examiner—Jared J. Fureman
(74) Attorney, Agent, or Firm—McGlew and Tuttle, P.C.

(57) ABSTRACT

An apparatus which can data process IC cards and can issue IC cards is provided using a simple structure, which can draw cards one by one. The apparatus can data process IC cards inserted from the exterior of the apparatus and can issue a processed IC card to the exterior of apparatus. A processor with an electrical connection data processes an IC card when it is positioned by positioning structure, which connects the inserted IC card to the processor connection. The apparatus includes a roller and an idler, the idler being mounted on an idler shaft rotatable about a rotation axis of the roller to transfer the IC card to a collection position.

11 Claims, 31 Drawing Sheets

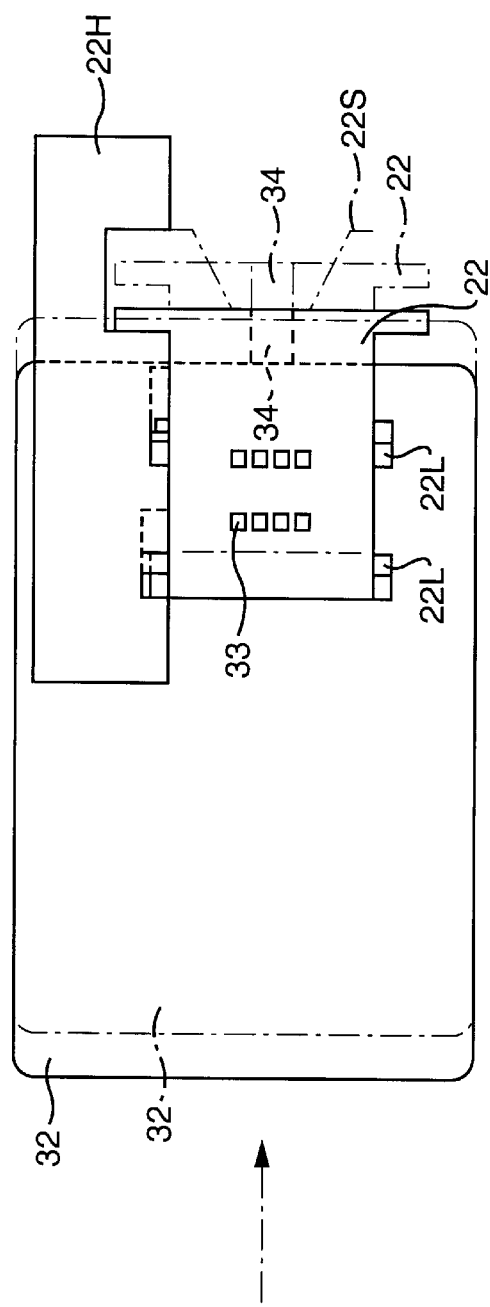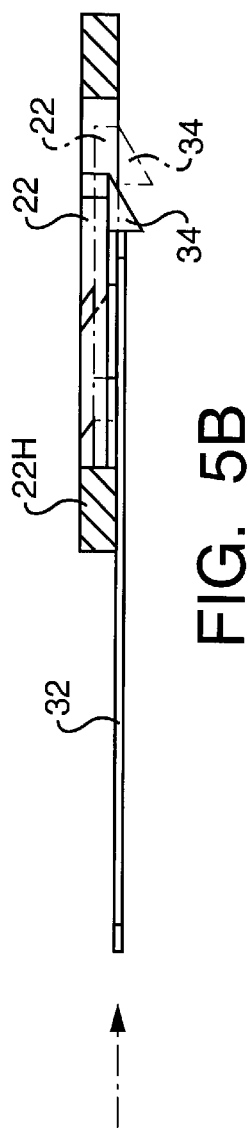
FIG. 5A
FIG. 5B

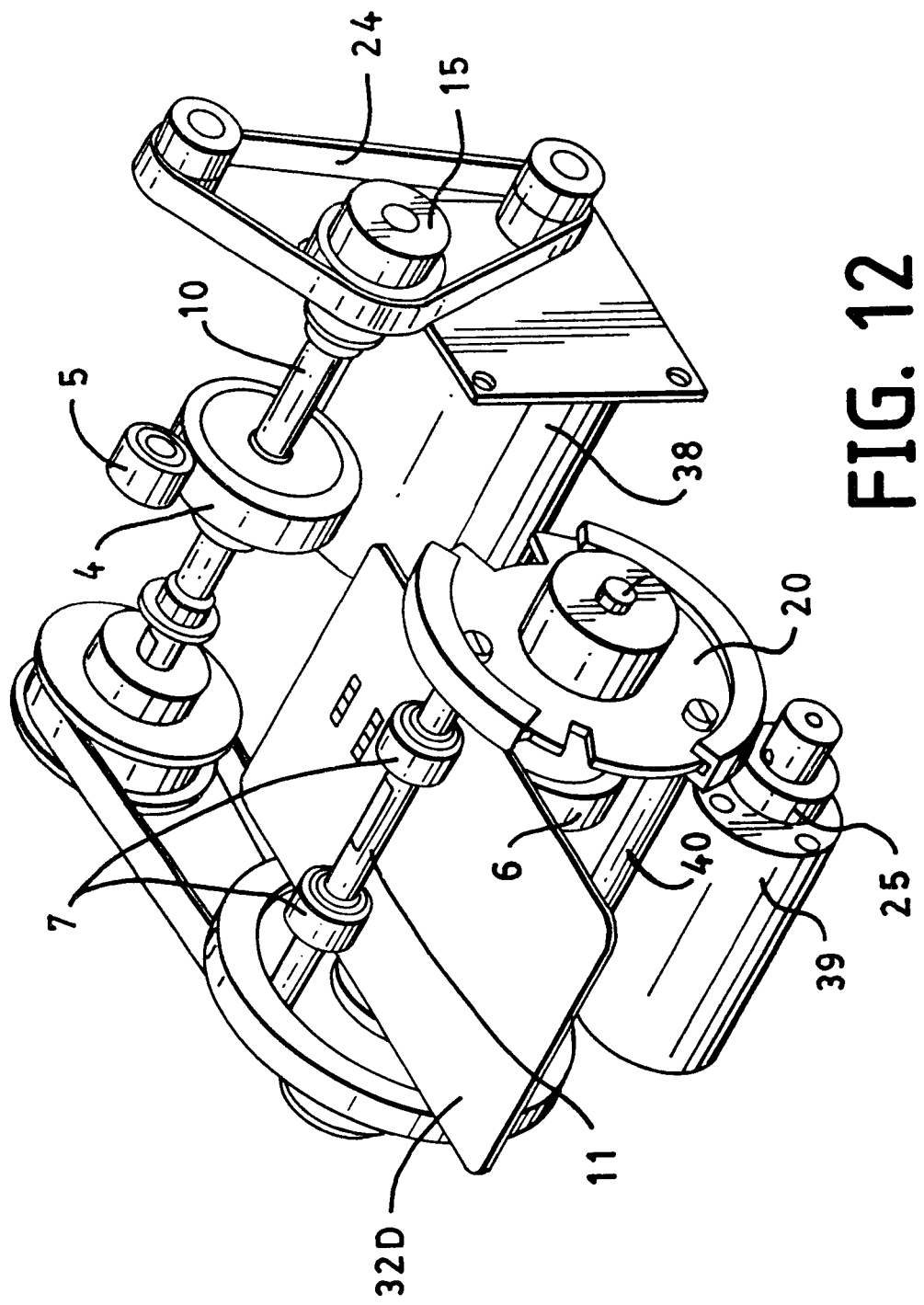

MACHINE FOR PROCESS FOR IC CARDS AND APPARATUS FOR ISSUING IC CARDS

FIELD OF THE INVENTION

This invention relates to an apparatus for issuing IC cards which has an embedded thin integrated circuit chip, i.e., IC chip. More particularly, the invention relates to an apparatus for issuing IC cards, which is used at the fee payment in game arcades, etc., as fare payment for transport (e.g. electric trains), or at automatic vending machines of goods. The invention relates to an apparatus for issuing IC cards, which is suitably installed for dispensing the IC card automatically, which pulls out a blank IC card without data and writes data to this IC card for sale. The IC card may be encoded via communication means.

The invention also relates to a machine process for IC cards which are used for payment as described above with a suitable process for IC cards to treat the IC cards as cash. The invention further relates to a machine process for IC cards suitable to perform various payments, using IC cards on which data relating to money amounts were written. The machine write data in a blank IC card without data and subsequently issues the IC card.

BACKGROUND OF THE INVENTION

Until now, various apparatuses for selling cards have been developed. For example, the applicant's Japanese Utility Patent Application Number 63-60147 discloses a card-issuing-apparatus for a suitable card vending machine. This application is published as Japanese Utility Model Publication Number 7-26276 (corresponding to U.S. Pat. No. 4,993, 587). The card-issuing-apparatus has an accommodation chamber 500 for accommodating a multi layer body 300 of cards upwardly, as shown in FIG. 17. The issuing apparatus is provided with a supporting plate 400. This maintains the multi layer body of cards 300 from the lower position. Also, the issuing apparatus is provided with a drawing roller 50 for cards under the supporting plate 140. Card-issuing rollers 107 and 109 are provided between the drawing roller 105 and card-issuing opening 140. The card, which is drawn out from under the card multi layer body 300 by the drawing roller 105, is sent to the exit 140 with the issuing rollers 107 and 109. The apparatus further arranges a roller 108, which is provided above the issuing roller 107 and prevents two sheets of card from issuing, and the roller 108 rotates in the reverse direction against the issuing direction.

The gap between rollers 107 and 108 is defined for passing only one sheet card which was drawn out by the drawing roller 105. When a card is blocked between rollers 107 and 108, the card is detected by the sensor (not shown) and the drawing roller 105 rotates in a reverse direction. If the drawing roller 105 is rotated for the reverse direction, the roller 108 for preventing two sheets of card from issuing, which is interlocked with the roller 105, is also rotated in the reverse direction. However, since the mechanism of roller 108 is provided with the clutch structure, the start of reverse rotation of roller 108 is delayed for a while from the start of reverse rotation of drawing roller 105. Therefore, the card, which is blocked between the rollers 107 and 108, is returned the reverse direction against the issuing direction. In addition, the symbols 100 and 200 shown in FIG. 17 are sideboards, which respectively comprise the card accommodation chamber 500.

The symbol 106 is the drive shaft of drawing roller 105. The symbol 109 is a card discharge roller. The symbol 111 is the shaft of roller 107. The symbol 112 is the shaft of roller 108 for the reverse rotation. The symbol 113 is the shaft of discharge roller 109. The symbol 114 is the shaft of an assistance roller 110. The symbol 115 is an electric motor for driving. The symbol 116 is the shaft of motor 115. The symbols 117, 119, 120, 121, 122, and 124 are respectively pulleys. The symbol 118 and 123 are respectively belts. The symbol 370 is a protrusion of drawing roller 105. The symbol 380 is a window, which is opened at the supporting plate 400. The symbol 390 is a weight for the cards. The symbol 440 is an arm of a detection switch.

The above-mentioned card payment apparatus is provided only with a function, which draws one sheet at a time of several-laminated cards reliably from the bottom position.

Unexamined-Japanese-patent 10-186795 discloses an issuing apparatus for IC cards. This issuing apparatus of the IC cards comprises at least: connector means for performing data processing of an IC card inserted from the exterior; means to connect the inserted IC card to the connector means; and means for drawing externally the IC card on which data processing is performed by means of the connector means. Furthermore, the issuing apparatus of the IC cards comprises at least: means for drawing only an IC card which is positioned at the bottom most or outside of the IC cards piled; connector means for performing data processing of the drawn IC card; means for connecting the drawn IC card to the connector means, means for sending out externally the IC card which data processing was performed by means of the connector means.

The possibilities of IC card use, particularly with built in IC chip, includes the provision of micro computers with memories. For this reason increasing demand is anticipated.

SUMMARY AND OBJECTS OF THE INVENTION

It is an object of the invention to provide an apparatus which can perform the steps for data processing IC cards and issuing the IC cards, by adding a simple structure to an apparatus, which can draw cards one by one.

Another object of the invention is to offer an apparatus, which can perform IC card data processing from the exterior of apparatus, and which can issue an IC card for the exterior of apparatus.

According to the invention, an apparatus for issuing IC cards is provided comprising at least: connector means for performing data processing of an IC card inserted from the exterior; means for connecting the inserted IC card to the connector means; and means for discharging externally the IC card on which data processing is performed by the connector means.

Also, this invention provides an apparatus for issuing IC cards comprising at least: means for drawing only an IC card positioned on the most bottom or exterior of the IC cards piled up; connector means for performing data processing of the drawn IC card; means for connecting the drawn IC card to the connector means; and means for discharging externally the IC card on which data processing is performed by the connector means. Further, this invention is an apparatus for issuing IC cards comprising means for collecting an IC card which was processed or is not processed by the connector means at the inside of said apparatus. This invention is a process machine for IC cards comprising at least: shutter means for detecting an IC card from the outside of said machine and accepting the IC card into the inside thereof; connector means which performs data processing on the IC card accepted in the machine; means for connecting the accepted IC card to the connector means; and, means for sending out externally the IC card on which data processing was performed by means of the connector means.

According to the invention, a machine process for IC cards includes discharging an IC card from piled IC cards; performing data processing on IC card; connecting the discharged IC card to the connector means; moving out the IC card on which data processing was performed by means of the connector means; and, detecting the IC card from the moving-out means and issuing (sending out externally) the IC card.

Further, this invention is a process machine for IC cards comprising means for collecting the IC card which was processed or is not processed by means of the connector means at the inside of the machine.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 5A is a plan and side sectional views, which show partially, in phantom line, a use condition of FIG. 4;

FIG. 5B is a side sectional view, which show partially in phantom line a use condition of FIG. 4;

FIG. 12 is a perspective view, which shows partially enlarged some principal parts of the device shown in FIG. 2;

DESCRIPTION OF THE PREFERRED EMBODIMENT

Figure 1:
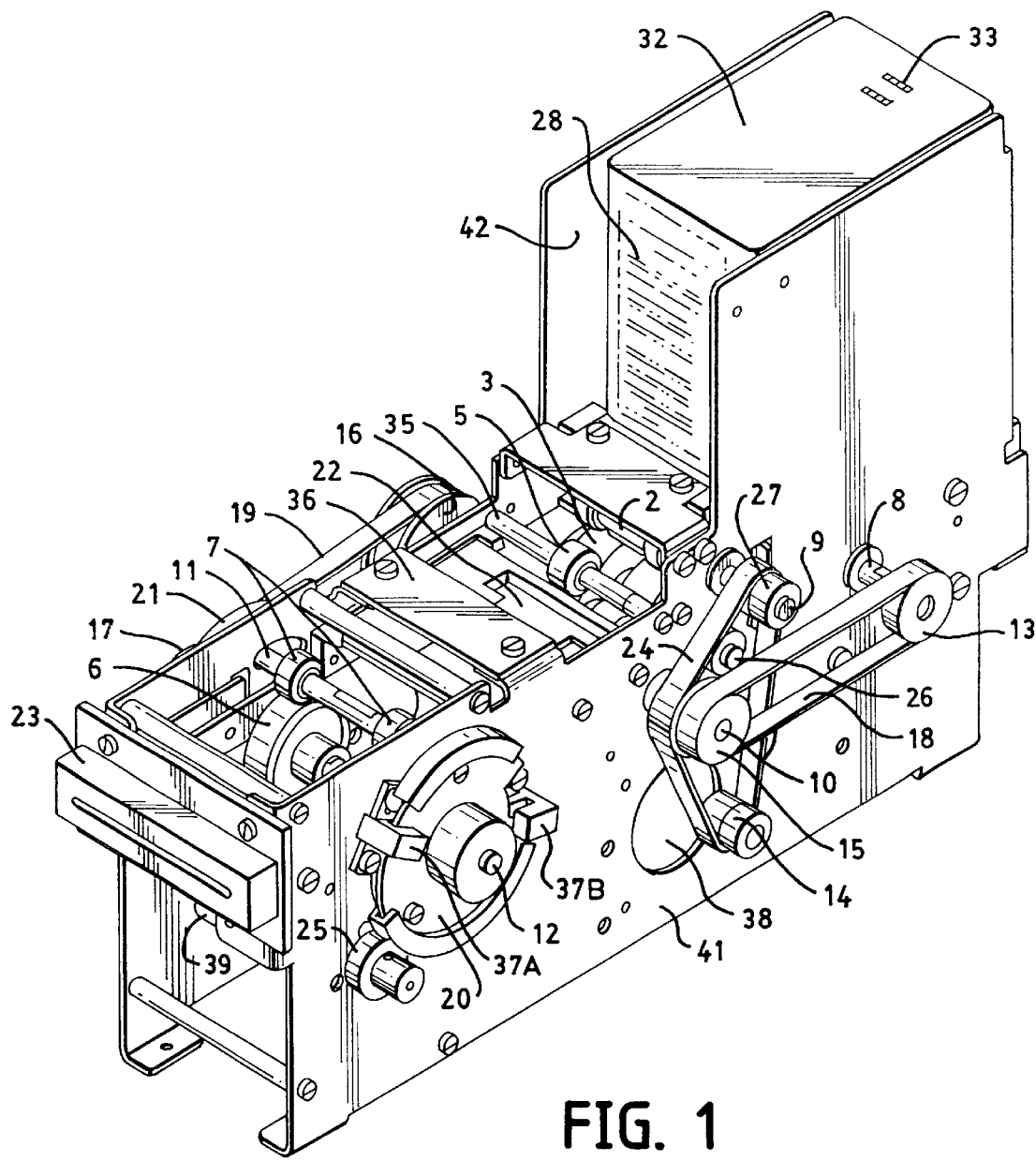
FIG. 1 is a schematic perspective view showing one embodiment according to the invention.

Referring to the drawings in particular, the apparatus of in FIG. 1 includes a pair of large L-shaped boards or sideboards 41 and 42. The upper-right part, between the sideboards 41 and 42, holds a stack 28, which is comprised by accumulated IC cards 32 in the shape of a pillar. The IC card 32 has an embedded thin integrated circuit chip (not shown), i.e., an IC chip, integrated as part of the overall card . Pads 33 forming IC chip connections are provided on the surface of the IC card 32. In this case, the number of pads 33 is eight (other numbers such as 6 or others are also possible).

Figure 2:
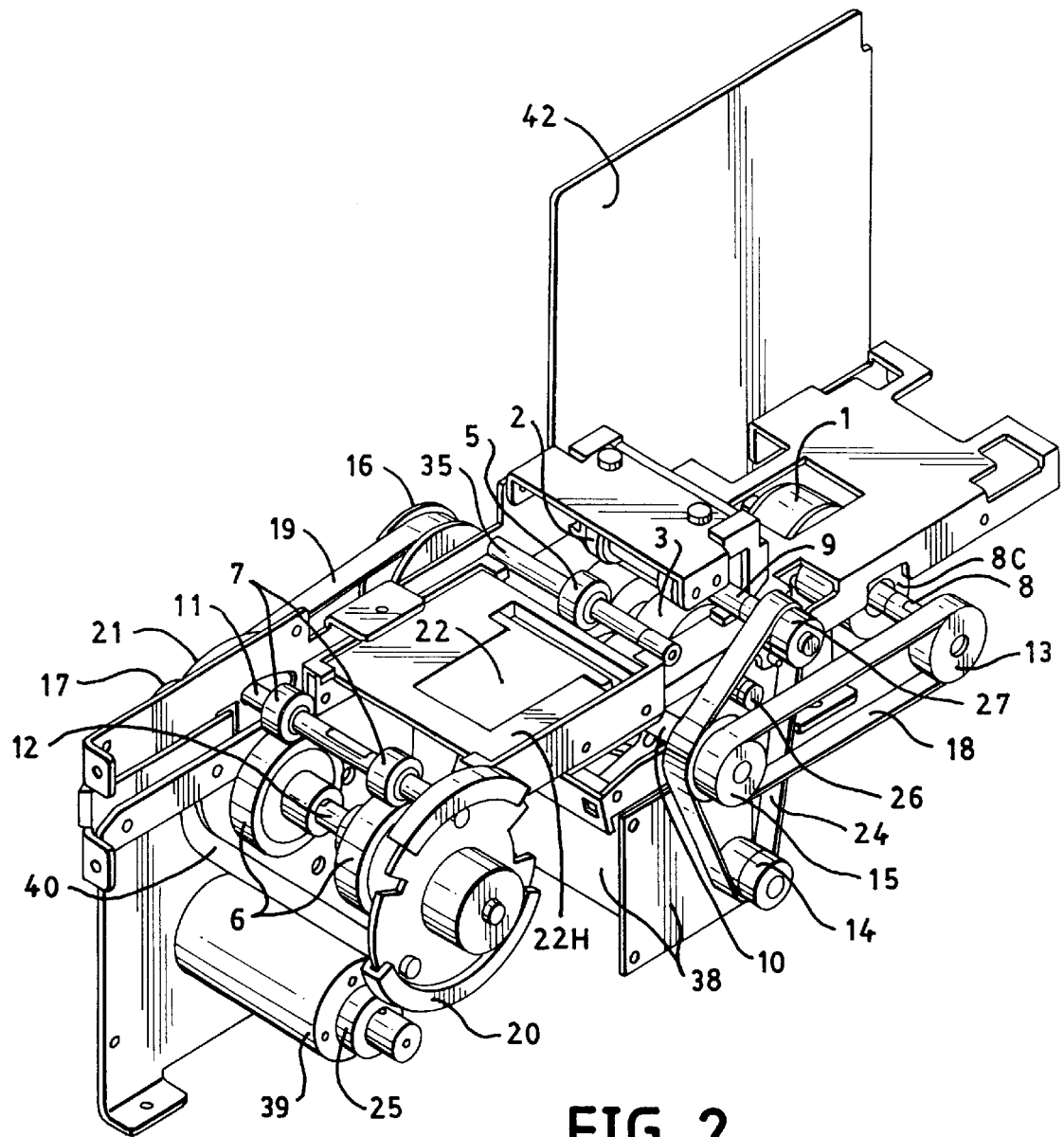
FIG. 2 is a schematic perspective view showing the device of FIG. 1 with a part removed.

The motor 38 for drawing IC cards 32 is built-in, in the central position between sideboards 41,42. The rotating shaft of a motor 38 installs a pulley 14. In FIG. 2, a symbol 1 is a roller. The roller 1 is rotate-ably installed on a shaft 8 and has a clutch mechanism. A clutch 8C (see FIG. 2) is attached to the shaft 8, and the clutch 8C performs the same movement as shaft 8. In addition, clutch 8C is coupled to roller 1 by means of a solenoid SL (see FIG. 6) via an arm (not shown). Further, the end part of shaft 8 installs a pulley 13. In order to draw out an IC card 32 under stack 28, a pair of rollers 3 are arranged near the roller 1 (see FIG. 3).

The rollers 3 for sending a drawn IC card 32 are rotatably attached to the apparatus via a shaft 26. Above the sending roller 3, rollers 2, which prevents two sheets of IC card 32 from being sent out, are attached via a shaft 9. A pulley 27 is installed to the edge part of a shaft 9. A roller 4, for drawing (see FIG. 3) an IC card, is arranged between a pair of sending rollers 3. The roller 4 is arranged to the apparatus via a longitudinal shaft 10. A pulley 15 with step is installed to the one-end part of shaft 10. A pulley 16 is installed to another-end part of shaft 10. Above the drawing roller 4 of the IC cards, an idler 5 for pressing the IC card is arranged rotatably. The idler 5 is attached to the apparatus via a shaft 35. In addition, a belt 24 spans the pulley 14, with a motor 38 which comprises a drive source for the two-steps-type pulley 15 and the pulley for reverse rotations 27. Further, a belt 18 spans the pulleys 15 and 13.

Figure 3:
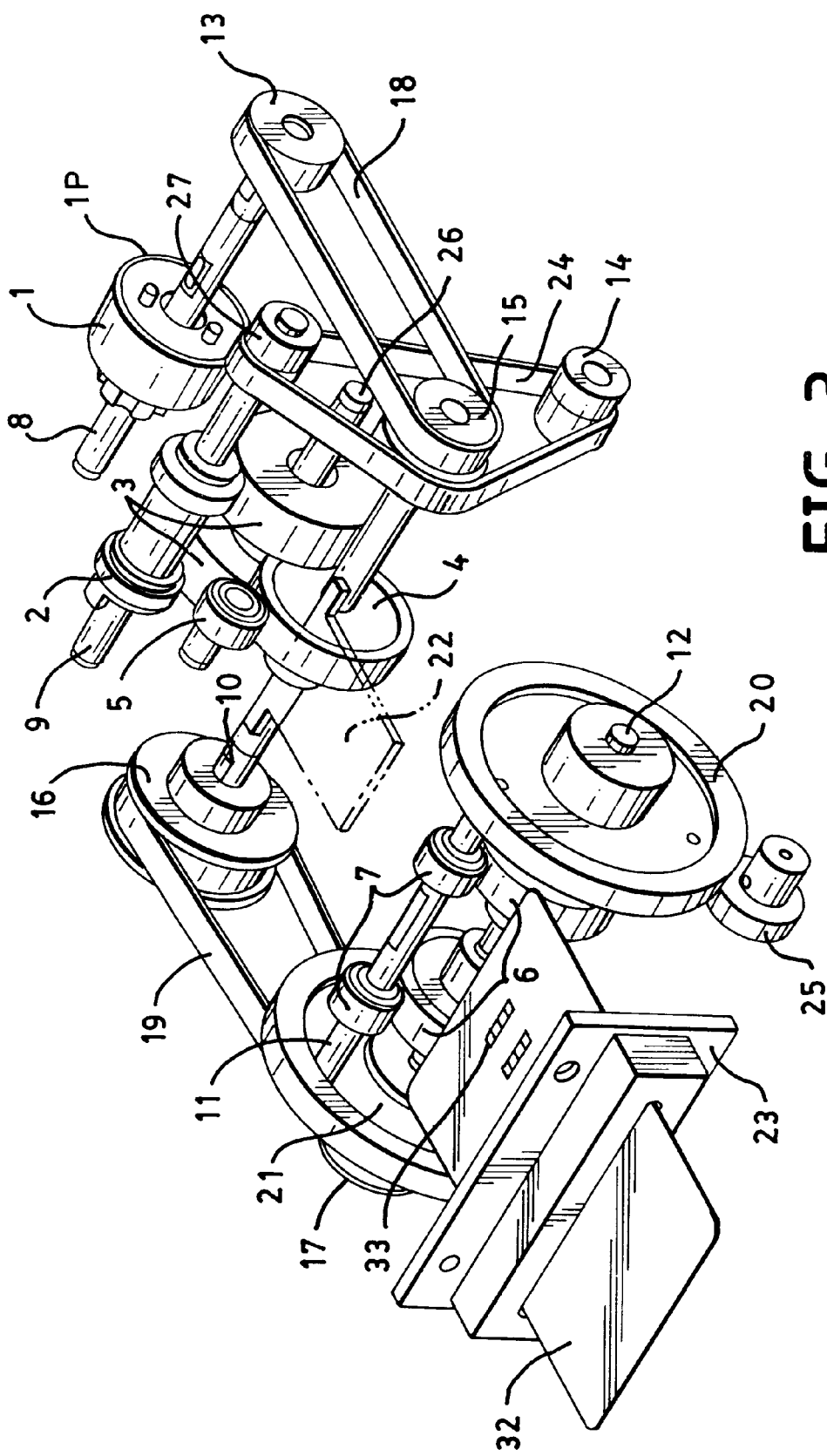
FIG. 3 is a schematic perspective view, which shows some principal parts of the device shown in FIG. 2.

In FIG. 3, a symbol 17 is a pulley. A belt 19 spans the pulleys 17 and 16 (see FIG. 9 (B)). And, the pulley 17 is installed to the end part of longitudinal shaft 12. A pair of rollers 6 for moving the IC card 32, is installed on the central part of the little longitudinal shaft. Further, at the end part 21 of longitudinal shaft 12, i.e., at the side of pulley 17, a hub with a large diameter is installed . A large gear 20 with a large diameter is installed at another end part of longitudinal shaft 12. In addition, the pair of hub 21 and gear 20 are respectively arranged on the exterior of the side boards 41 and 42 (see FIG. 1). Further, a shaft 11 is fixed between the hub 21 and gear 20. A pair of idlers 7, which press a pair of rollers 6, is installed to the shaft 11.

Figure 15A:
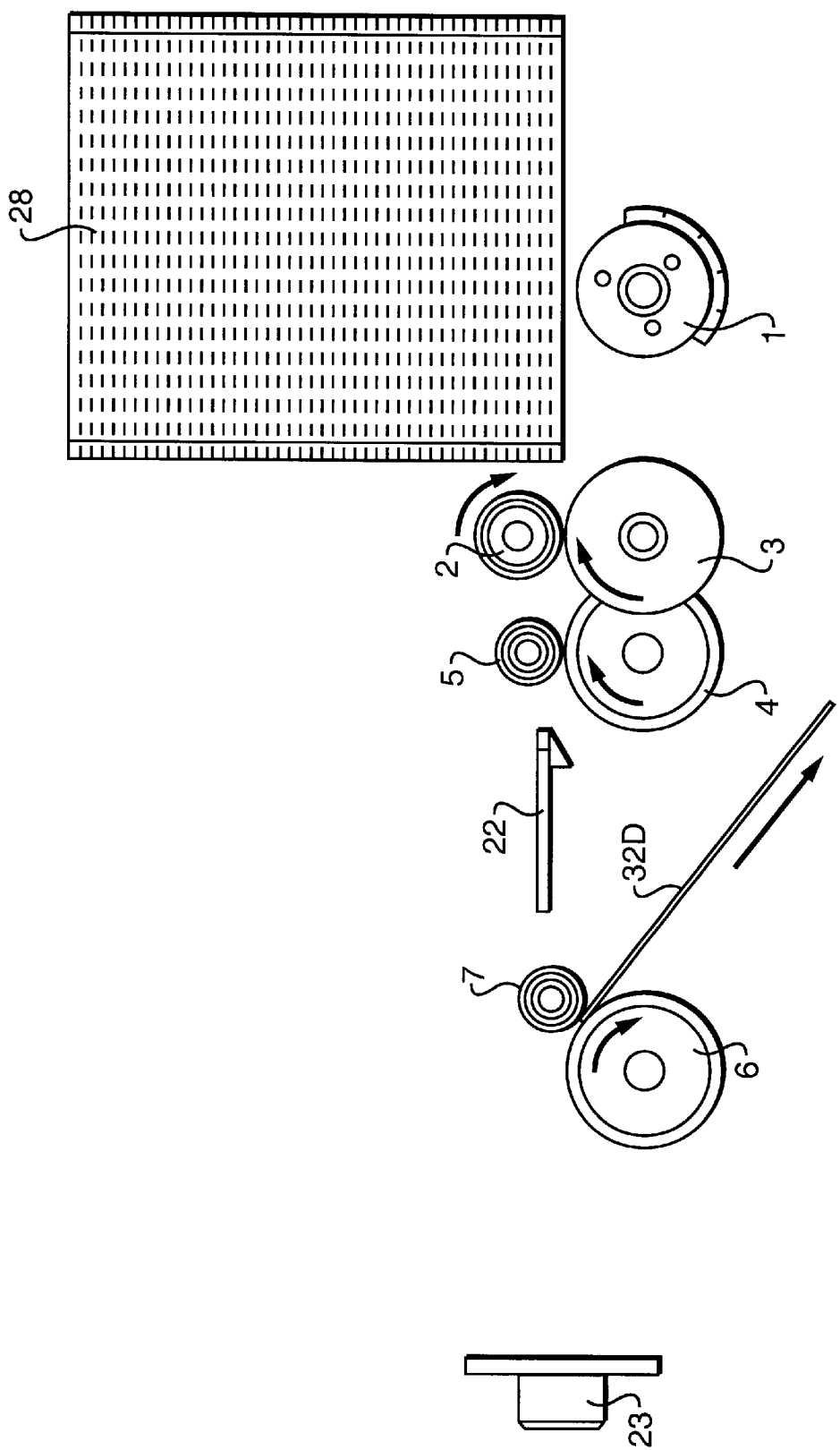
FIG. 15A is a schematic diagram showing operation characteristics of this embodiment.
Figure 15B:
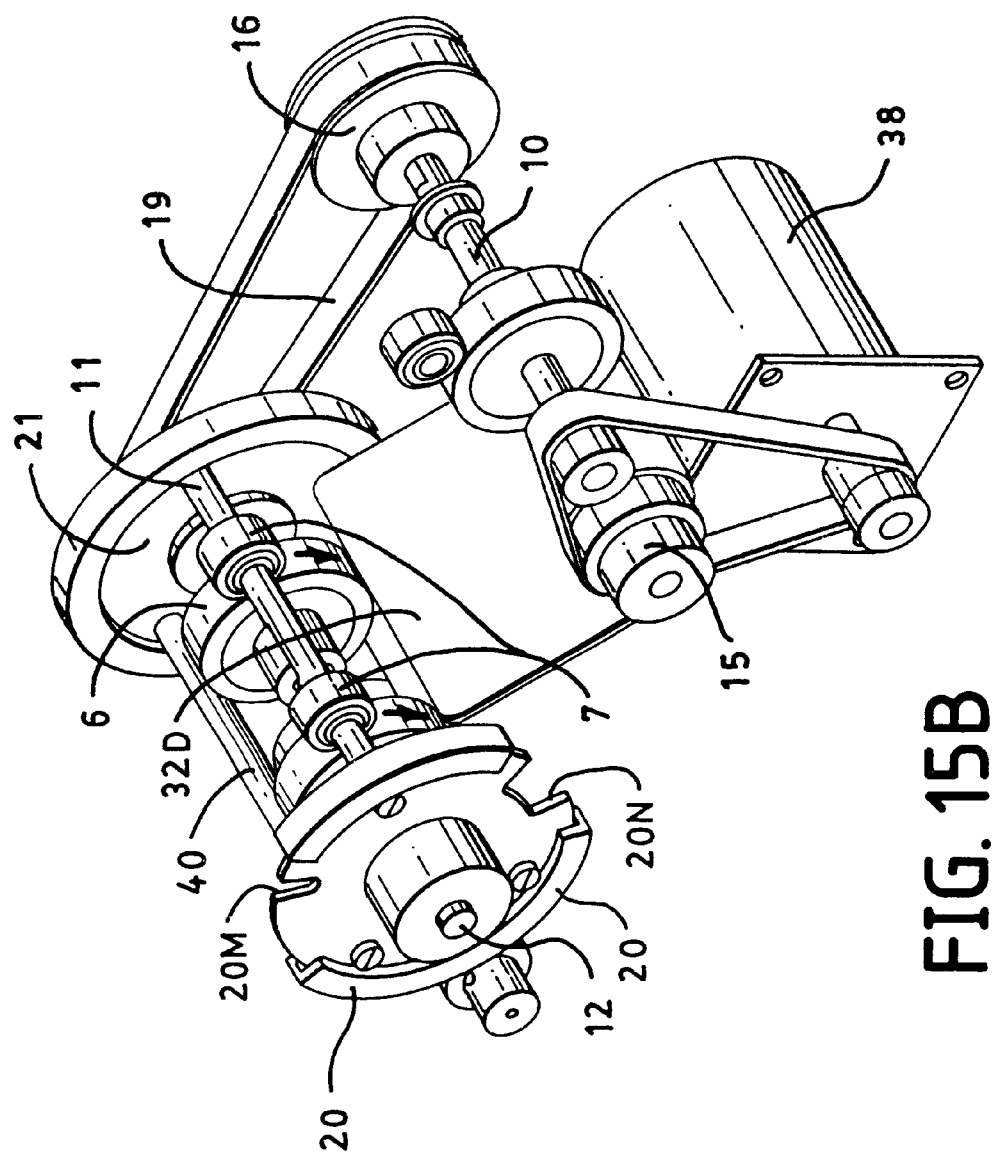
FIG. 15B is a perspective view, which shows partially enlarged some principal parts of the device shown in FIG. 2.

In FIG. 2, a symbol 39 is a motor. The motor 39 is a drive source which collects IC cards 32 with inferior quality, for example, inside the apparatus. A pinion 25 is installed on the rotating shaft of motor 39. The pinion 25 meshes with the large gear 20. In addition, in FIG. 1, a symbol 23 is a receptacle frame. The receptacle frame 23 guides an IC card 32 issued out from the apparatus. Further, symbols 40 are rods for coupling. The rods 40 reinforce the bond of hub 21 and gear 20 (see FIG. 15 (B)).

The T-shaped member in the center of FIG. 2 is a connector 22 for the IC card 32. The connector 22 is slidably contained at the horizontal direction in a housing 22H with substantially square-ring shape (see FIG. 5). The connector 22 has a plurality of protrusions 22L with small rhombus shape on the both sides, as shown at enlarged in FIG. 4. At the central of a long edge on the undersurface of connector 22, a small hook 34 with triangle-pole shape is formed. The hook 34 catches the edge of IC card 32, as shown in FIG. 5. At the undersurface of connector 22, a plurality of c contacts (not shown) is arranged.

Figure 4:
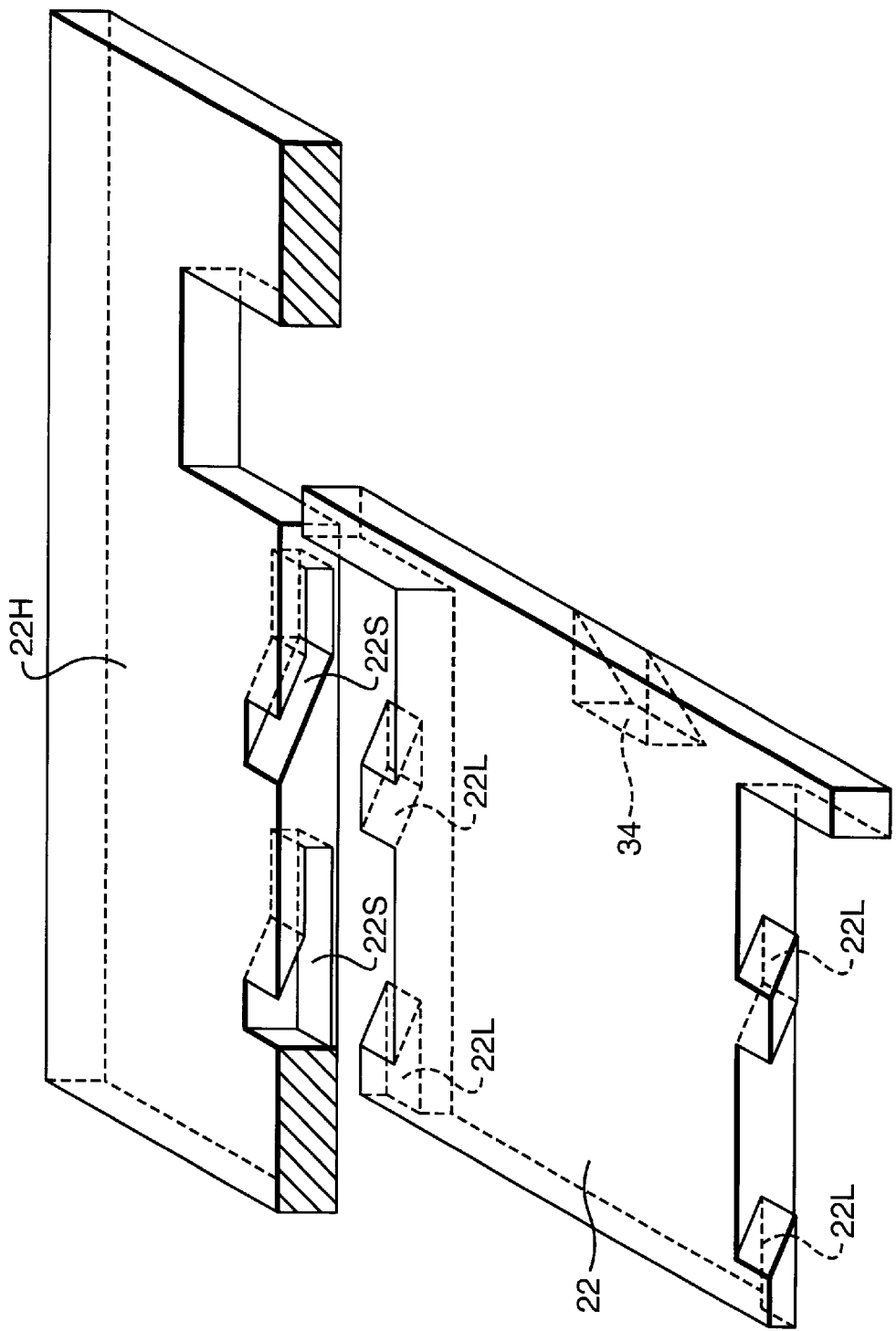
FIG. 4 is a perspective view, which shows partially enlarged some principal parts of the device shown in FIG. 2.

In FIG. 4, a part of housing 22H is shown in enlarged. On the both sides in the housing 22H with square-ring shape, a plurality of inclined slots 22S are formed. These slots 22S slidably contain the rhombus-like protrusions 22L. Further, a symbol 36 as shown in the center of FIG. 1 is a circuit board for the connector 22.

Figure 18:
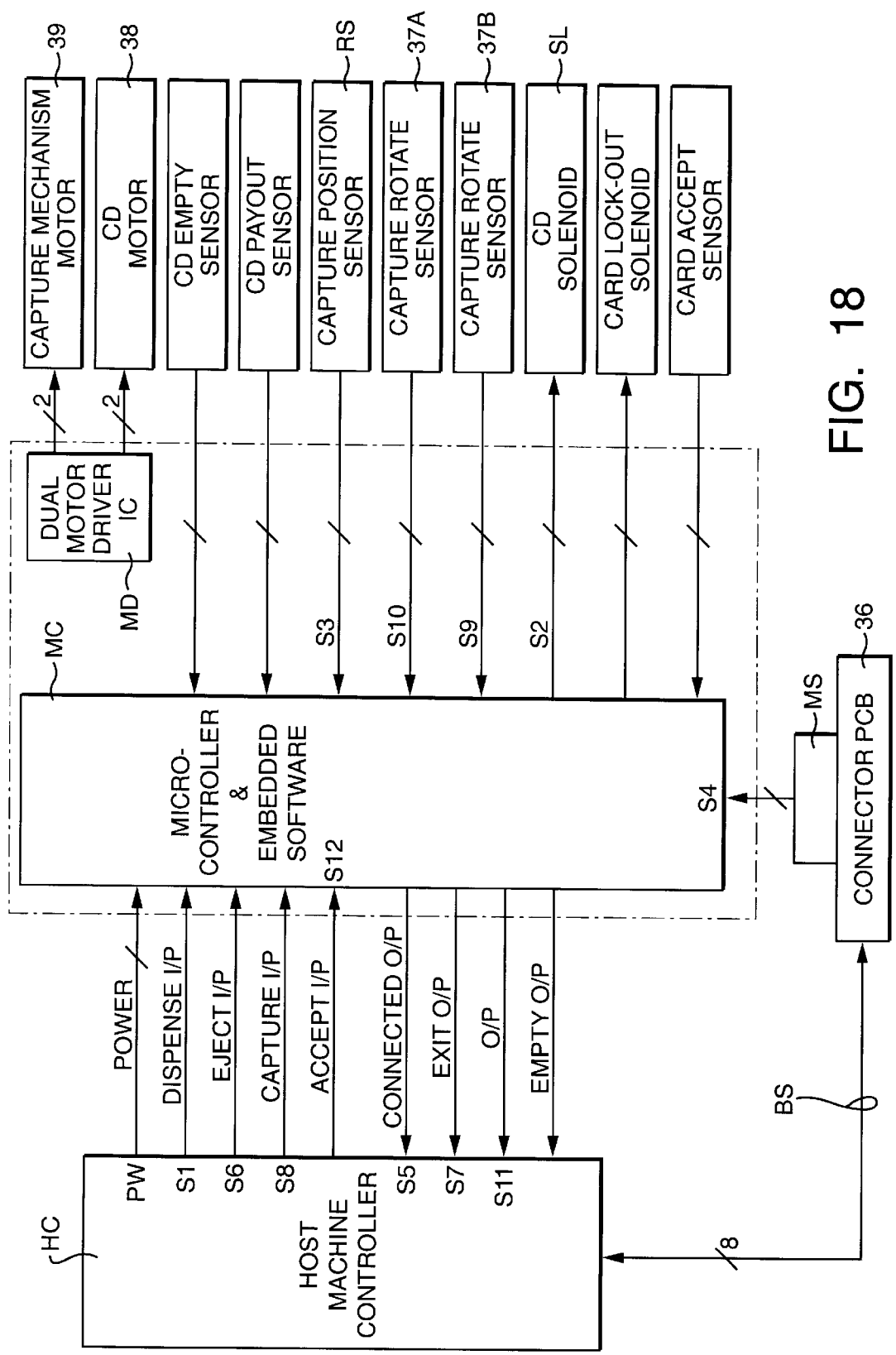
FIG. 18 is a block circuit diagram showing operation characteristics of the embodiment of FIG. 1.

FIG. 18 is a block circuit diagram, which is used in this example. FIG. 18 is explained here in a schematic manner. In the left of FIG. 18, the symbol HC is a controller for a host machine (not shown). The symbol MC in the center of FIG. 18 is a controller of the apparatus. In addition, the forward and reverse rotations of motors 38 and 39 are controlled via a drive circuit MD. In the example, if a drawing signal Sl of IC card 32 is output from the main controller HC, motor 38 will forwardly rotate via controller MC and drive circuit MD.

If motor 38 forwardly rotates, pulley 14 will be rotated and belt 24 will be actuated and pulley 15 is rotated. Furthermore, pulley 13 is rotated via belt 18 and shaft 8 is rotated. If solenoid SL is switched on with a discharge signal S2, roller I will be rotated by clutch 8C (see FIG. 6). Consequently, IC card 32 of the most bottom in stack 28 is sent out by convex-part IP of drawing roller 1. As shown in FIG. 7, the front end of IC card 32, which is sent out by convex-part 1P, is sent in between rollers 2 and 3 and passes through between these rollers.

At this time, the reverse rotation of roller 2 is performed. For this reason, two-sheets of IC cards 32 being issued or sent is prevented. Furthermore, the front end of IC card 32 sent out is picked-up by the rotating roller 4 and idler 5. The IC card is sent out to the direction of connector 22. Still, at this time, solenoid SL is turned OFF and clutch 8C is detached. As the result, roller 1 is not rotated although shaft 8 is rotated (see FIG. 7). In this way, the front end of IC card 32 sent out by roller 4 and idler 5 hits the hook 34 of connector 22. Cleared by the structure shown in FIGS. 4 and 5, hook part 34 of connector 22 is moved a little bit upwardly (see FIG. 8). Therefore, the IC cards 32 progresses. And, the pick-up of front end of the IC card 32 is performed by the rotation of roller 6 and idler 7. The IC card 32, which was picked-up, is sent out to the direction of receive frame 23 by roller 6 and idler 7 (see FIG. 9 (A) and (B)). IC card 32 is separated from hook 34 completely. And when the front end is detected by sensor RS of reflecting-type, motor 38 will perform the reverse rotation via a signal S3.

Figure 10:
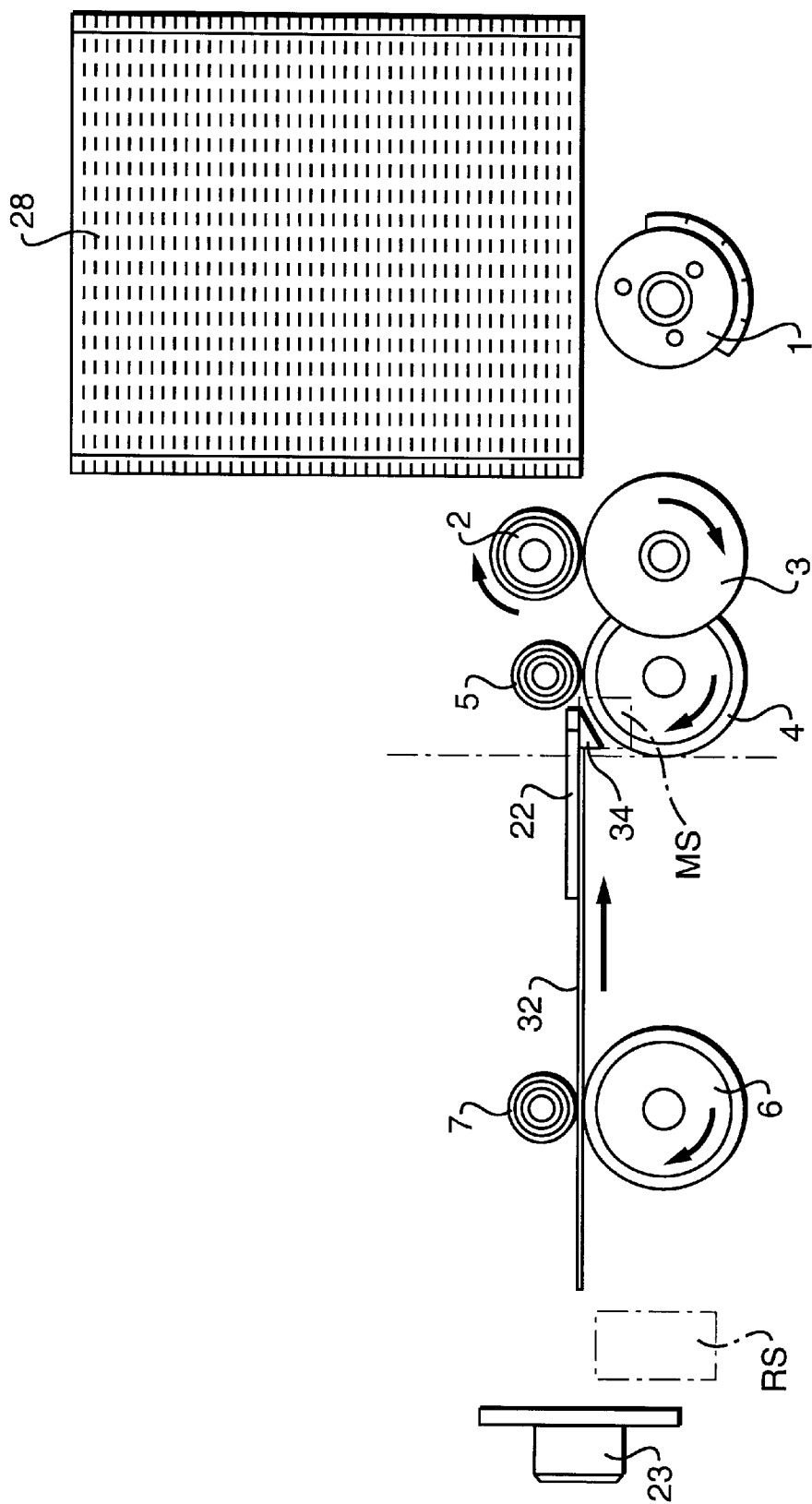
FIG. 10 is a schematic diagram showing operation characteristics of this embodiment.

The reverse rotations of roller 6 and idler 7 are performed by the reverse rotation of motor 38. IC card 32 is returned to the direction of hook 34 (see FIG. 10). Then the front end of IC card 32, which is returned to the direction of hook 34, strikes hook 34 and is caught, connector 22 is moved to the direction of lower diagonal, as shown in FIG. 5. Therefore, the pads 33 of IC card 32 contact with the contacts (not shown) of connector 22. Almost simultaneously, the leading edge of connector 22 switches ON a mechanical type switch MS. If the switch MS is turned ON, a signal S4 will be sent out to the apparatus controller MC. The controller MC sends out a connection signal S5 to host controller HC. When signal S4 indicates that the pads 33 of IC card 32 have been connected to the contacts of connector 22, the rotation of roller 6, i.e., the motor 38 is stopped. In this way, the IC card 32 rests still in the condition of having connected with the connector 22.

The data processing in IC card 32 is performed in this rest condition. That is, via a 8-bit bus BS, the host controller HC performs data writing and reading on the chip (not shown) in IC card 32. When the data communication of main controller HC and IC card 32 is performed, an issue signal S6 from controller HC is sent out to the supplement controller MC. If the issue signal S6 is sent out, the supplement controller MC will rotate forwardly the motor 38 via the drive circuit MD. In this way, the IC card 32 is sent in the direction of a receptacle frame 23 by roller 6 and idler 7 (see FIG. 11). At this time, the connector 22 is returned at the original position by a spring 22S (see FIG. 5). The spring has a substantially V shape.

Figure 11:
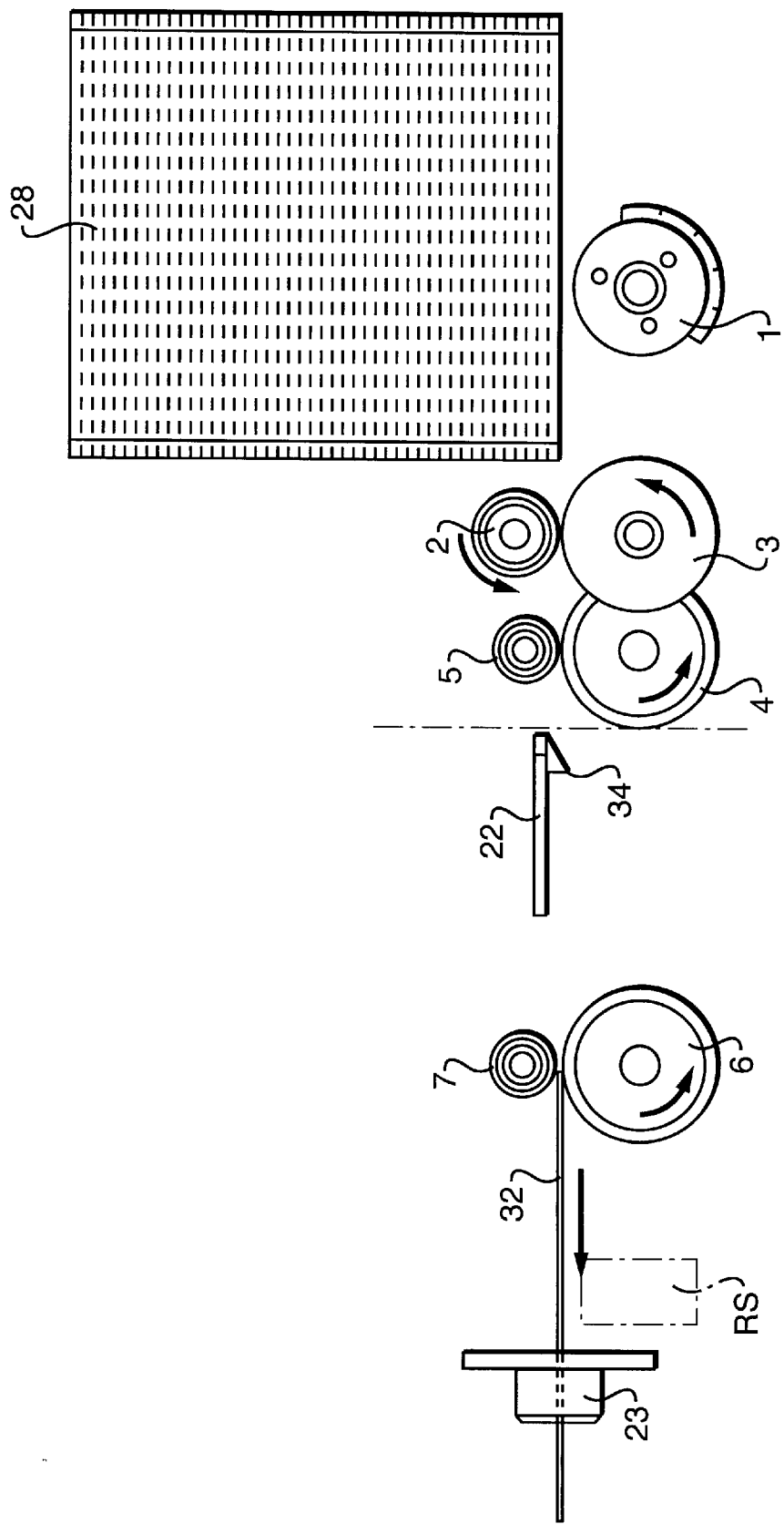
FIG. 11 is a schematic diagram showing operation characteristics of this embodiment.

As shown in FIG. 11, IC card 32 reaches the receptacle frame 23. And extraction preparation by hand is completed. The sensor RS detects moving of IC card 32 at this time. Change of a detecting signal S3 of sensor RS is sent out to supplement control MC. If IC card 32 is pulled out by hand from the receptacle frame 23, the detecting signal S3 of sensor RS will vary. For example, a completion signal S7 is sent out from supplement controller MC. If the completion signal S7 is sent out, a power supply PW of supplement controller MC is turned off.

Figure 9A:
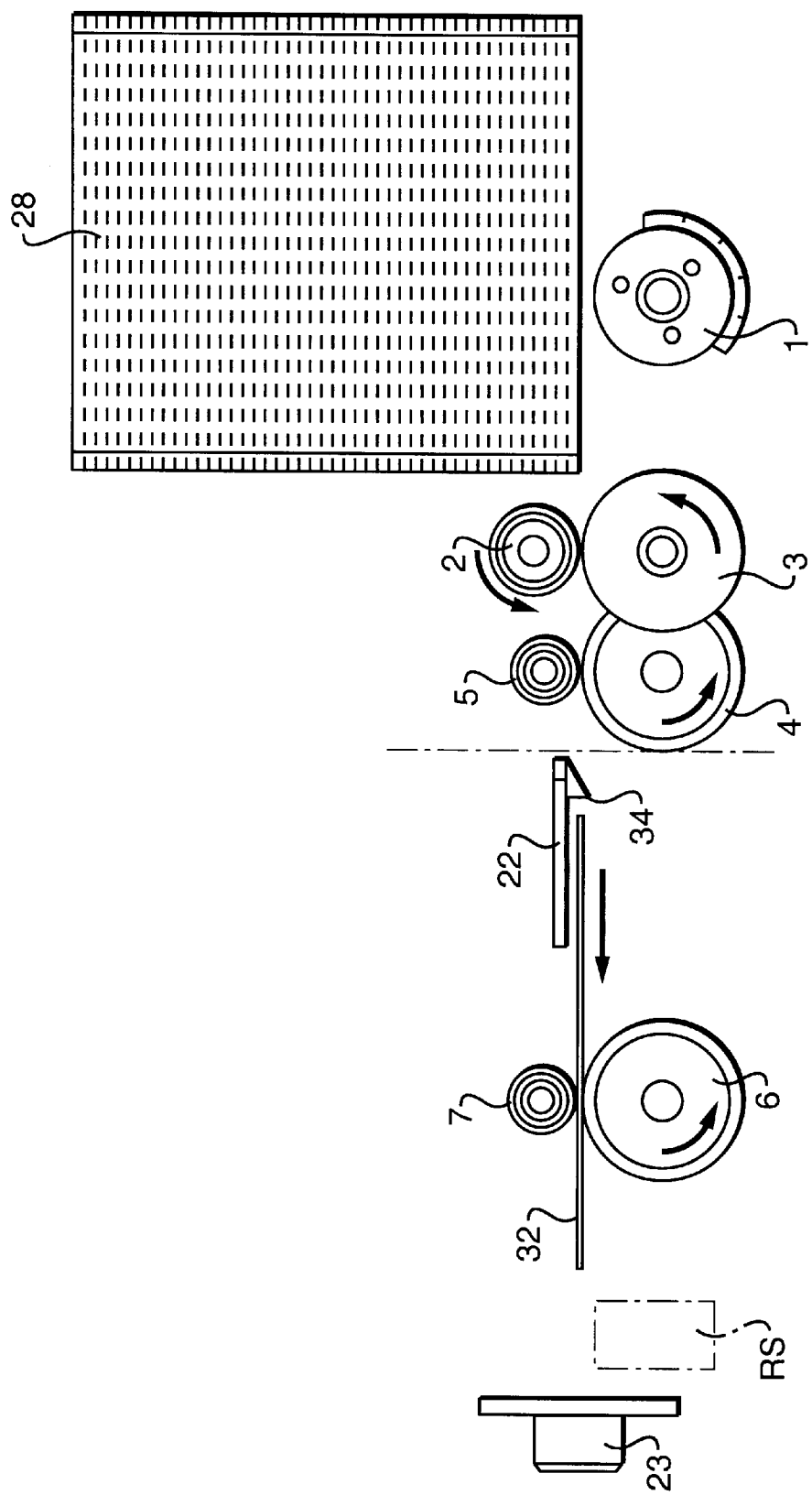
FIG. 9A is a schematic view showing operation characteristics of this embodiment.
Figure 9B:
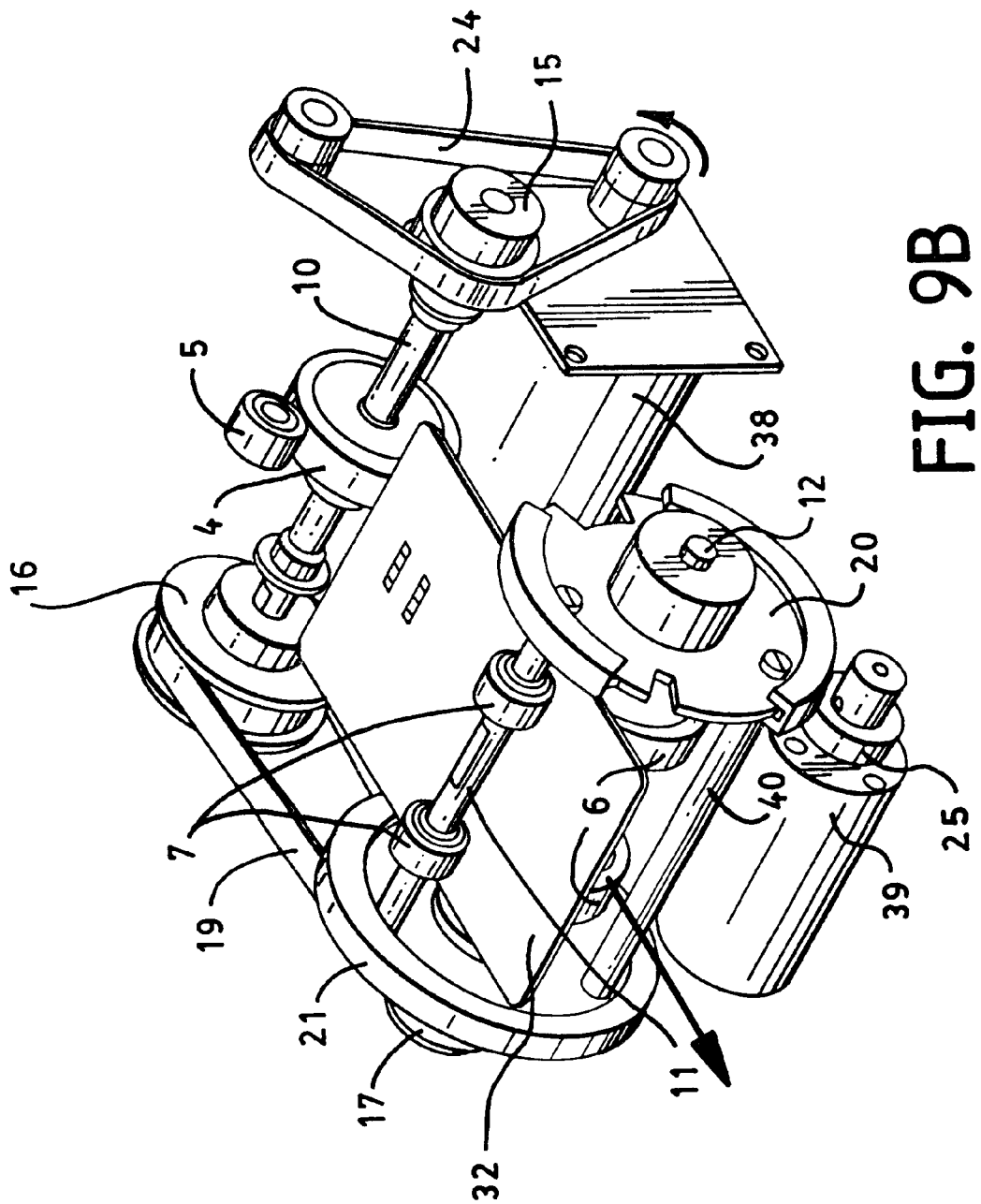
FIG. 9B is a perspective view, which shows partially enlarged some principal parts of the device shown in FIG. 2.
Figure 13A:
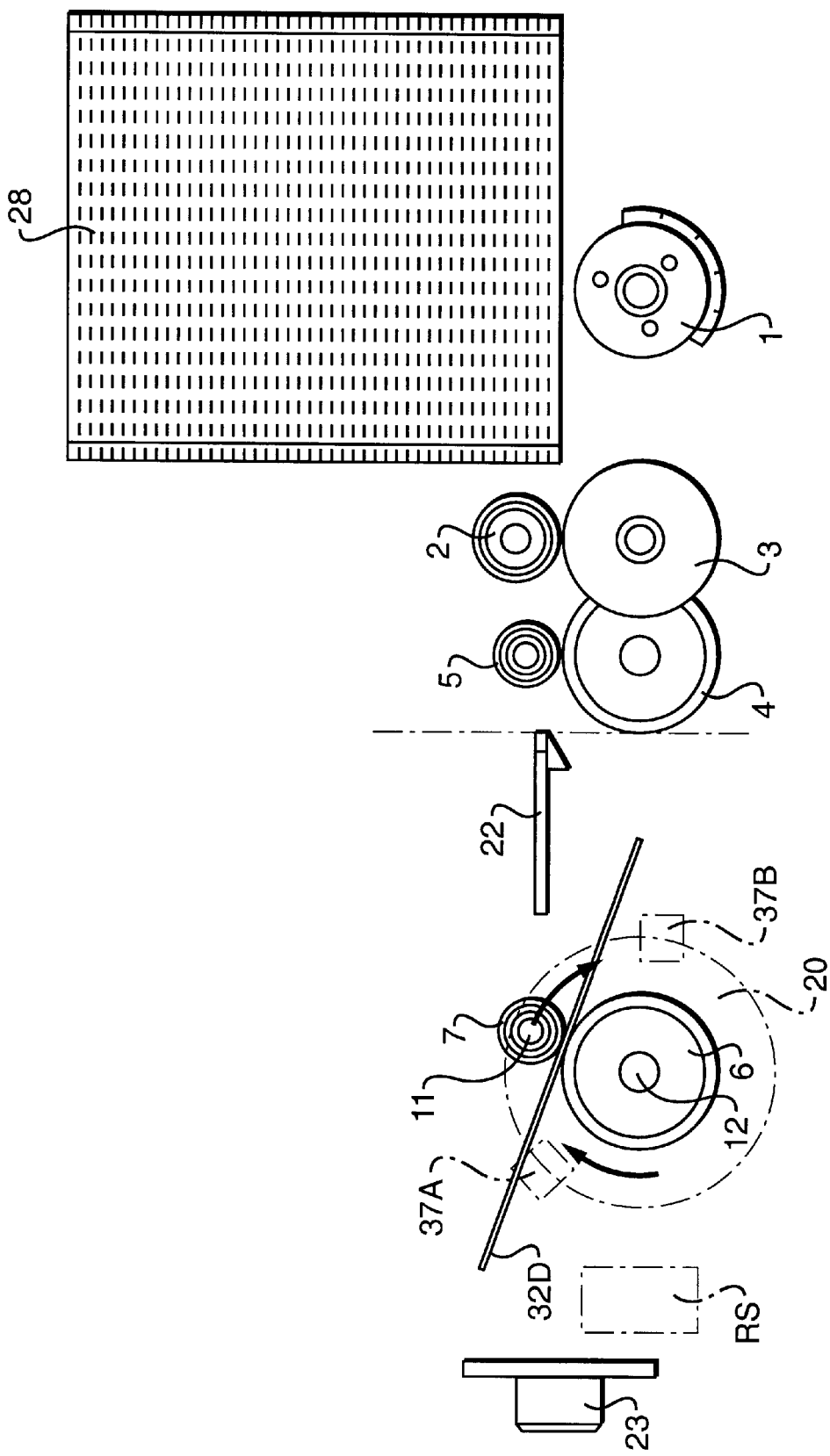
FIG. 13A is a schematic diagram showing operation characteristics of this embodiment.
Figure 13B:
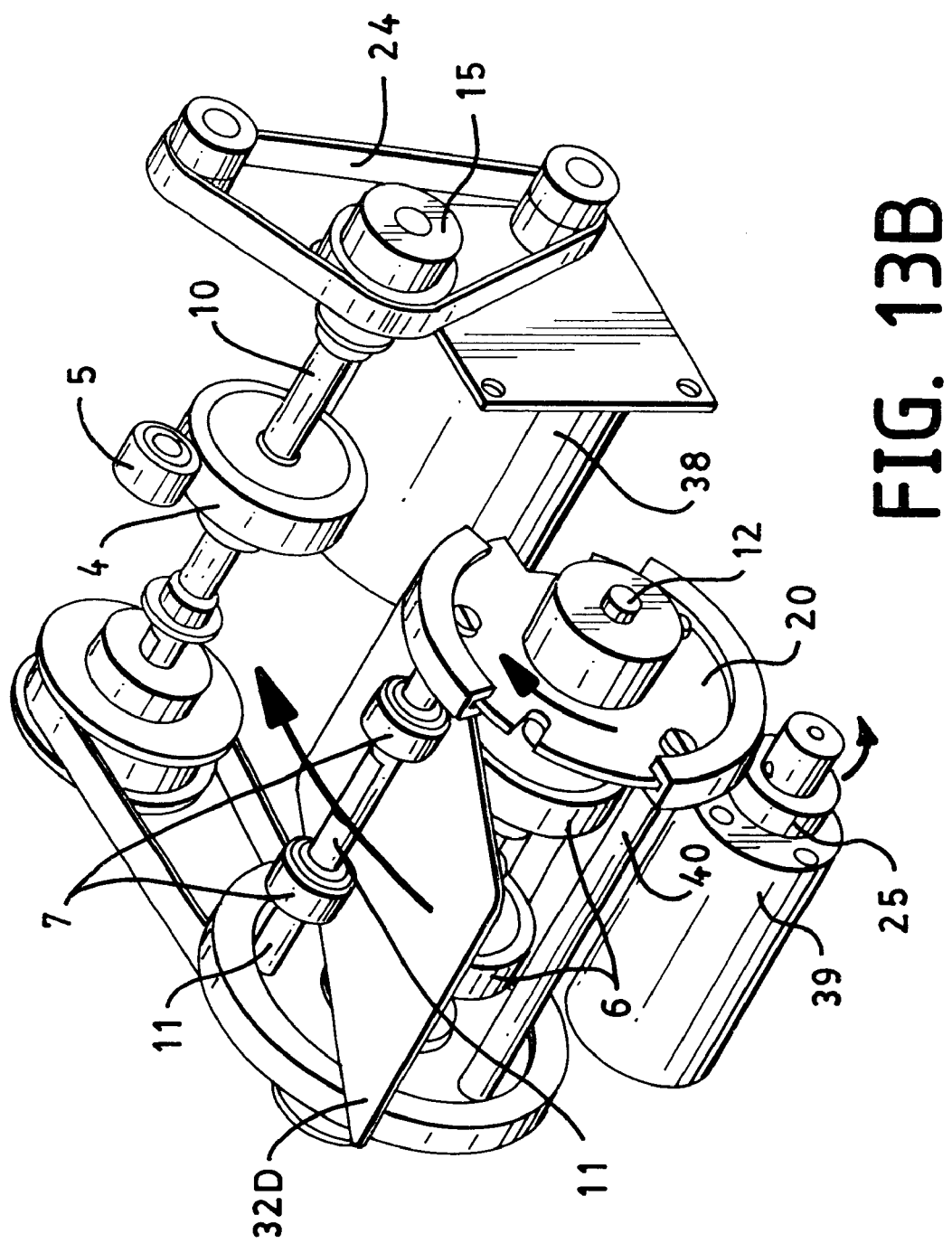
FIG. 13B is a perspective view, which shows partially enlarged some principal parts of the device shown in FIG. 2.
Figure 14A:
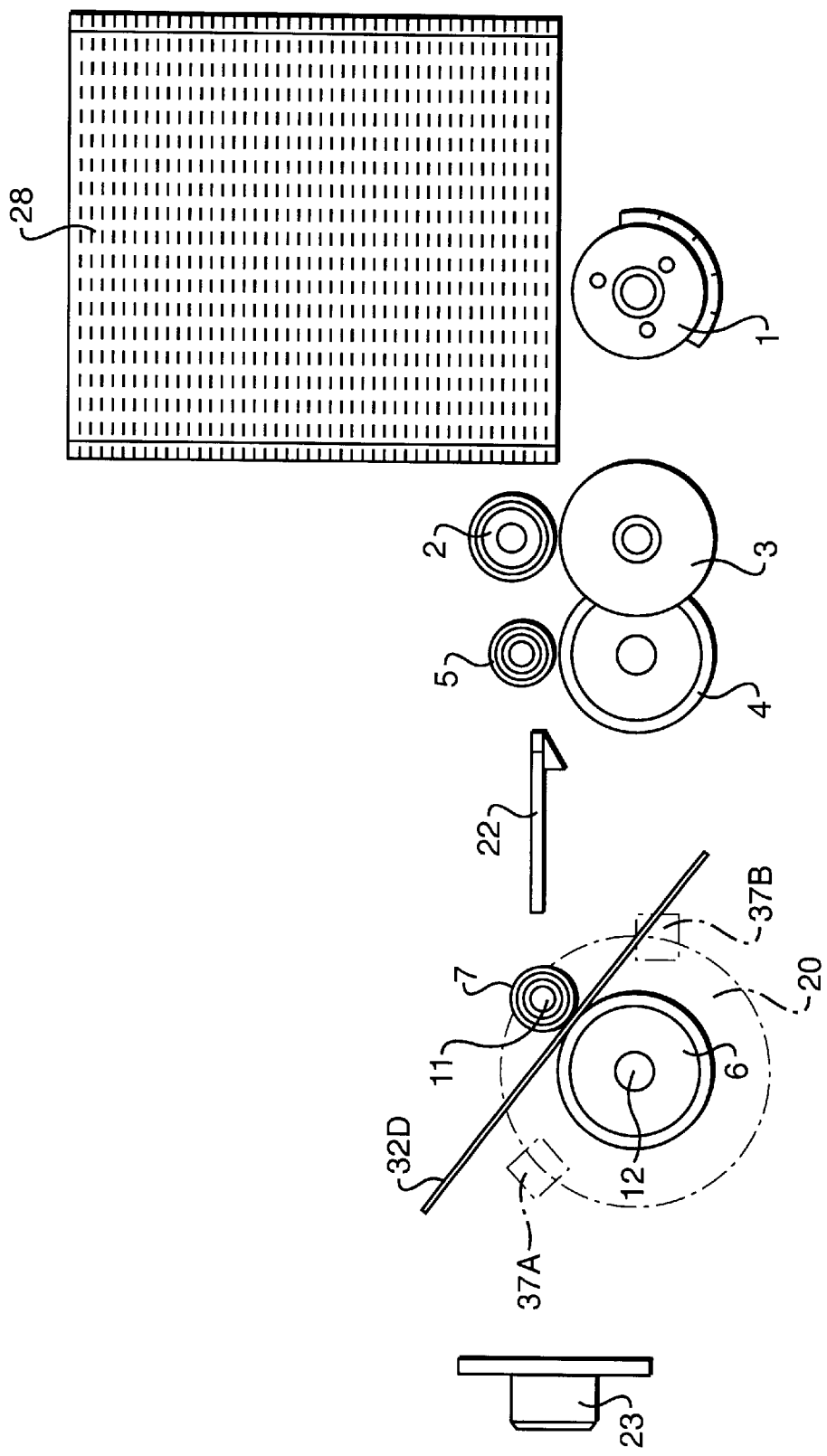
FIG. 14A is a schematic diagram showing operation characteristics of this embodiment.
Figure 14B:
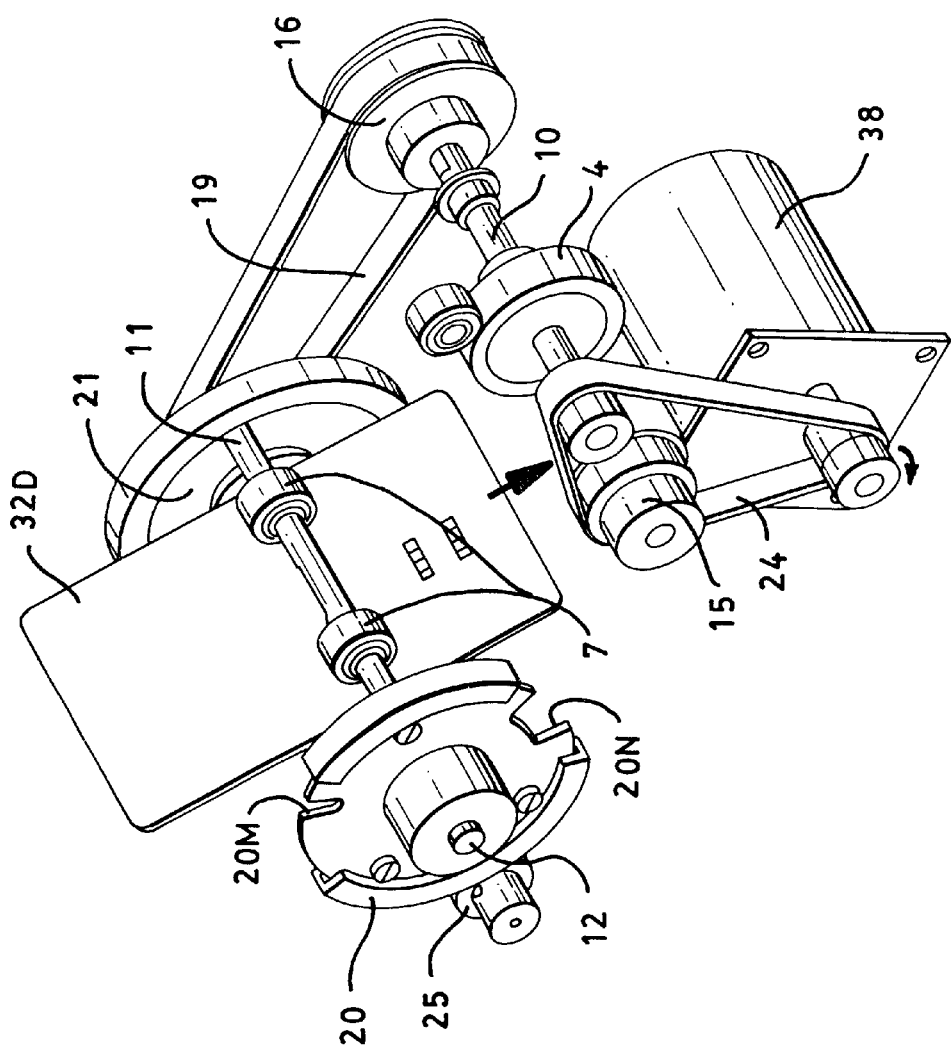
FIG. 14B is a perspective view, which shows partially enlarged some principal parts of the device shown in FIG. 2.

In addition, signals S1 to S7 are processed by the program of main controller HC and supplement controller MC. When the communication with the host controller HC and IC card 32 is not successful, IC card 32 is collected, for example. In this case, the IC card 32 is not in good condition, or the orientation in the stack is not suitable, or the head and tail surfaces of the IC card 32 in the stack are reversed, etc. A collecting signal S8 is then sent out to supplement control MC from main control HC. When the collecting signal S8 is sent out, the controller MC rotates motor 38 forwardly. In this way, as shown in FIG. 9 (A) and FIG. 9 (B), the collected IC card 32D is sent in the direction of receptacle frame 23 by roller 6 and idler 7. When collected the IC-card 32D is sent in the direction of the receptacle frame 23 and the front end is detected by the sensor RS, the motor 38 is stopped via the detecting signal S3 (see FIG. 12). The motor 39 is actuated by the apparatus controller MC, almost simultaneously. And, since pinion 25 meshes with gear 20, and shaft 12 is forwardly rotated. Consequently, the shaft 11 of idler 7 rotates around the roller 6 (see FIG. 13 (A) and (B)). As the IC card 32D is pinched by roller 6 and idler 7, the IC card 32D becomes inclined at about 40 degrees from the horizontal condition (see FIG. 14 (A) and (B)). At this time, the sensor 37B detects the large notch 20N of gear 20 and the rotation of pinion 25, i.e., motor 39 is stopped via a detecting-signal S9. Almost simultaneously, the reverse rotation of motor 38 is performed, and the reverse rotation of roller 6 is performed. Collected IC-card 32D is gathered downwardly in the drawings (see FIG. 15 (A) and (B)). Then, the rotation of motor 39 is reversed. Via pinion 25, gear 20 i.e., idler 7 is returned to the original position, as shown in FIG. 12. If idler 7 is returned to the original position, sensor 37A will detect a small notch 20M of gear 20. Via a detecting signal S10 of sensor 37A, the rotation of pinion 25 (i.e., the motor 39) is stopped or reset to the original condition.

Figure 16:
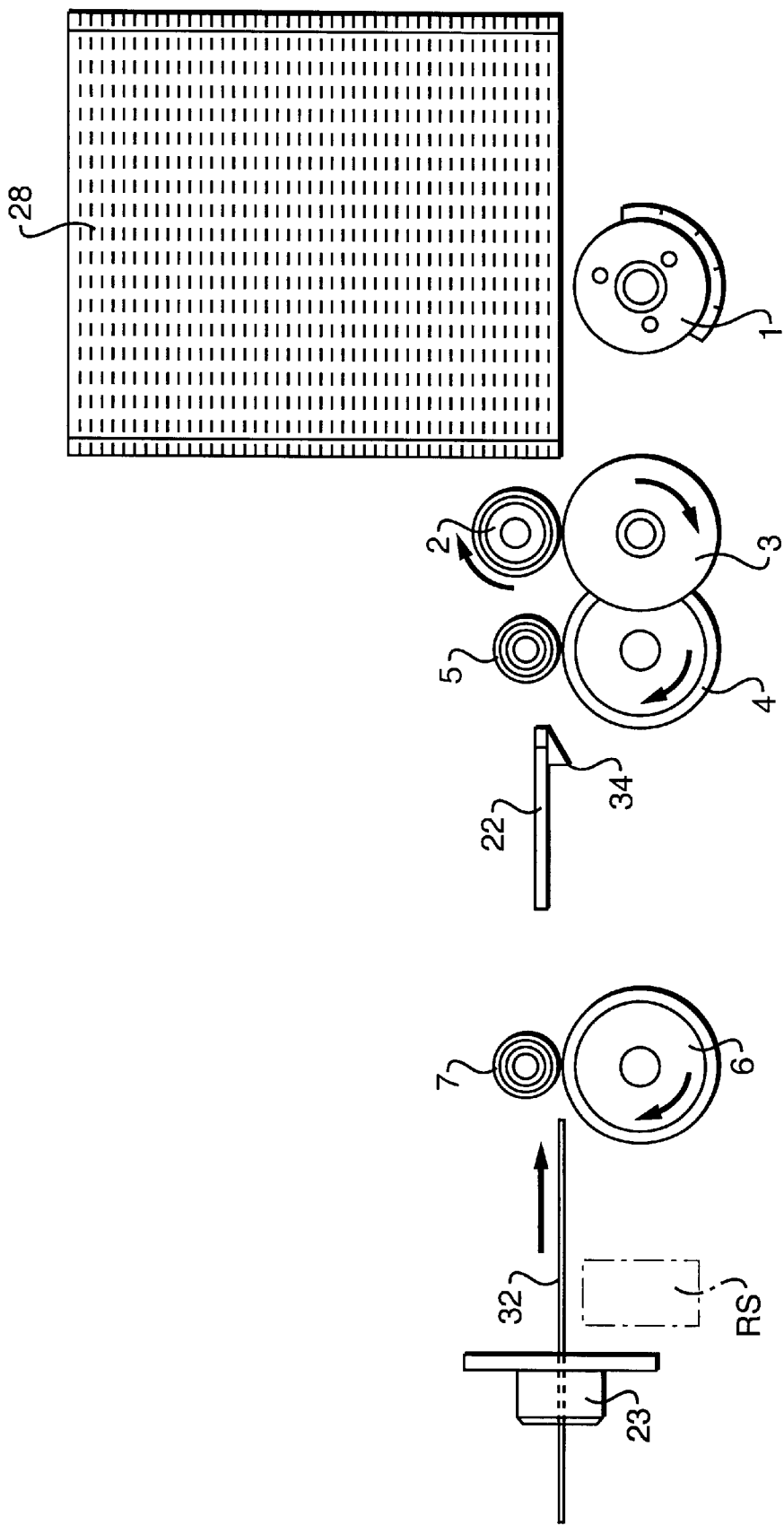
FIG. 16 is a schematic diagram showing operation characteristics of this embodiment.
Figure 17:
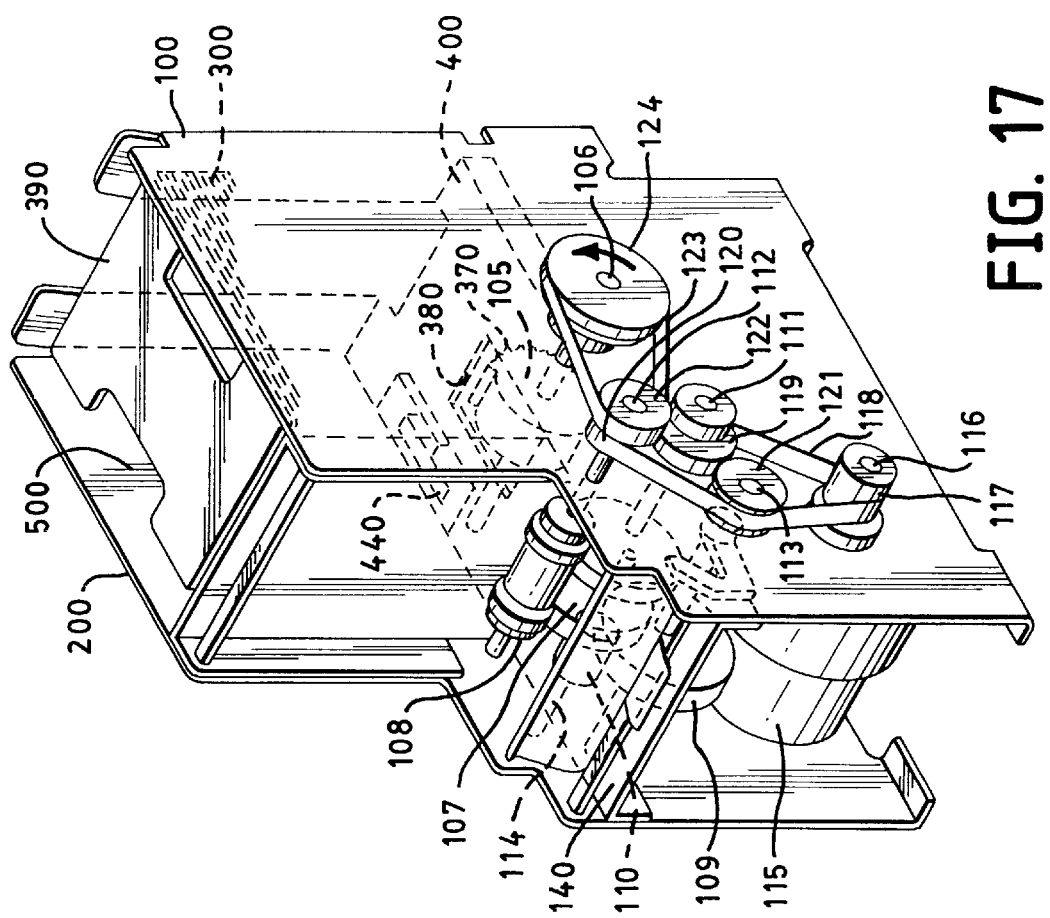
FIG. 17 is a schematic perspective view showing a prior art device.

As shown in FIG. 16, the IC card 32 is inserted in the inside of apparatus by hand from receiving frame 23. If the front end of IC card 32 passes sensor RS, a detecting signal S3 will be processed by controller MC. And, a signal S11 is reported to host controller HC. A signal S12 accepted from host controller HC is sent out to apparatus controller MC. If the acceptance signal S12 is received, controller MC will drive the motor 38 with the reverse rotation. In this way, if the front end of IC card 32 reaches between the roller 6 and idler 7, which perform the reverse rotation, IC card 32 will be further sent to the direction of connector 22. When the front end of IC card 32, which is sent to the direction of connector 22, hits the hook 34, connector 22 is moved lower in a diagonal direction. Therefore as has been shown in FIG. 10, the pads 33 of IC card 32 contact the contacts (not shown) of connector 22. Hereafter, when that the pads 33 of IC card 32 were completely connected to the contacts of connector 22 is confirmed, the rotation of roller 6 is stopped similar with having mentioned above. Consequently, the IC card 32 rests in the condition of connection with the connector 22. Therefore, the data processing will be performed by host controller HC. When completion of the data communication of controller HC and IC card 32 is performed, the issue signal S6 is sent out supplement controller MC from controller HC. Upon receiving the issue signals S6, supplement controller MC forwardly rotates the motor 38 via the drive circuit MD. In a similar way to that described above, as shown in FIG. 11, the IC card 32 reaches receiving frame 23. As the result, the extraction preparation by hand is completed. When the communication with host controller HC and IC card 32 is not successful, the IC card 32 is collected. In this case, as described before, the collecting signal S8 is sent out to supplement control MC from main control HC. Upon receiving the collecting signal S8, supplement controller MC forwardly rotates the motor 38. When collected the IC-card 32D is sent in the direction of receiving frame 23 and the front end is detected by sensor RS, the motor 38 is stopped (see FIG. 12). Almost simultaneously, if the motor 39 is actuated by the apparatus controller MC, the gear 20 will be rotated forwardly around the shaft 12. Since the IC-card 32D is pinched between roller 6 and idler 7, it becomes inclined at 40 degrees from the horizontal condition (see FIG. 14 (A) and (B)). At this time, sensor 37B stops the rotation of pinion 25, i.e., motor 39, via detecting signal S9. Almost simultaneously, the reverse rotation of roller 6 is performed, and collected IC-card 32D is gathered at the lower place in the drawing (see FIG. 15 (A) and (B)). Subsequently, the reverse rotation of motor 39 is performed. As shown in FIG. 12, gear 20 or idler 7 is returned to the original position. If idler 7 is returned to the original position, sensor 37A will detect the small notch 20M. The rotation of motor 39 is stopped via a detecting signal S10 of sensor 37A and it is reset to the original condition.

Figure 19:
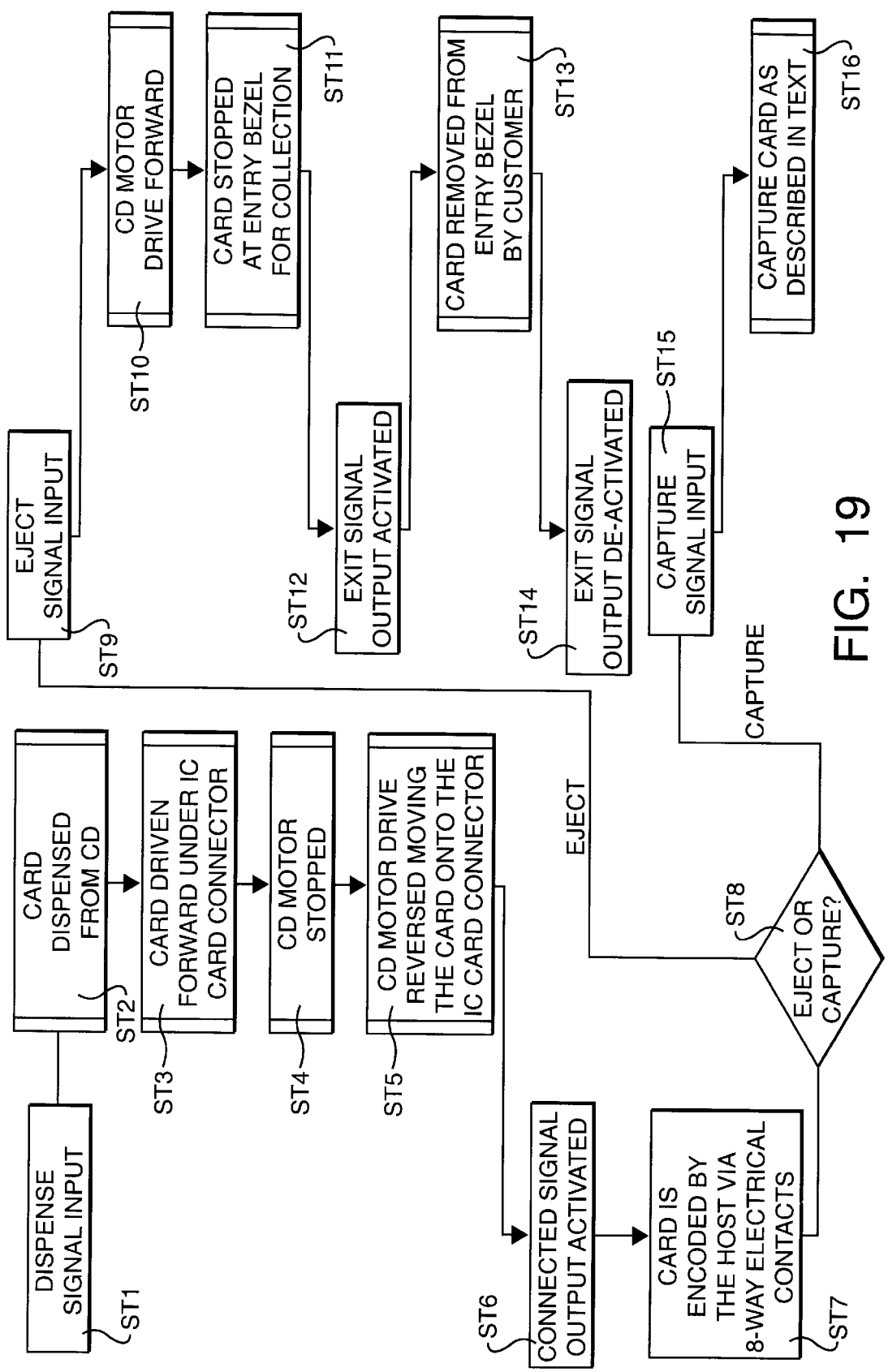
FIG. 19 is a flowchart showing operation characteristics of the embodiment of FIG. 1.
Figure 20:
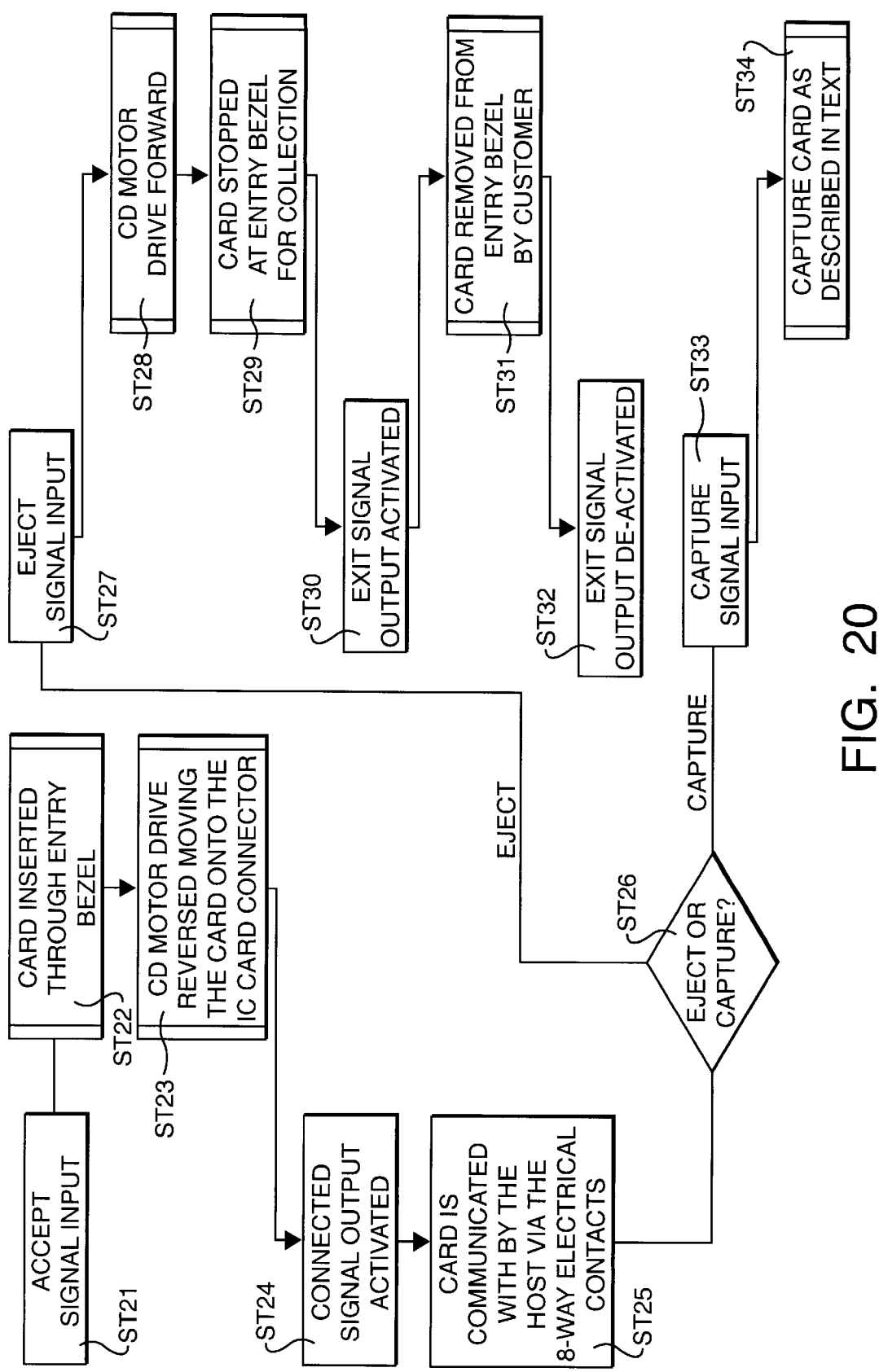
FIG. 20 is a flowchart for explaining further operation aspects of the embodiment of FIG. 1.

FIGS. 19 and 20 are flowcharts of operation of the above-mentioned example. In order to understand the above-mentioned operation herein an outline explanation of the flowcharts is provided.

If drawing signal S1 of IC card 32 is sent from main controller HC (step ST1), the most bottom of IC card 32 will be sent out by roller 1 (step ST2). The rotating roller 6 and idler 7 perform the pick-up of front end of IC card 32. IC card 32 is sent out in the direction of receiving frame 23 (step ST3).

If the sensor RS detects the front end of the IC card 32, motor 38 will perform the reverse rotation via signal S3 (step ST4 and step ST5). IC card 32 is connected to connector 22 by the reverse rotation of motor 38. The leading edge of connector 22 turns ON the switch MS. If switch MS is turned ON, apparatus controller MC send out connection signal S5 to host controller HC (step ST6). Consequently, IC card 32 rests in the condition of having connected with the connector 22.

In the connection state of rest, host controller HC encodes the chip in IC card 32 (step ST7). When the communication with main controller HC and IC card 32 is completed (step ST8), the issue signal S6 is sent out to supplement controller MC from controller HC (step ST9). If the issue signal S6 is sent, supplement controller MC will forwardly rotate the motor 38 via the drive circuit MD (step ST10). In this way, IC card 32 reaches receiving frame 23 by the roller 6 and idler 7 (step ST11).

At this time, the detecting signal S3 of sensor RS is sent out the supplement controller MC, and the completion signal S7 is further sent out from supplement controller MC (step ST12). When IC card 32 is pulled out from receiving frame 23, the completion signal S7 is not sent out. The entire apparatus returns to the original state (steps ST13 and ST14). When the communication with host controller HC and IC card 32 is not successful, IC cards 32 are collected (step ST8). At this time, the collecting signal S8 is sent out to the supplement controller MC from main control HC (step ST15). The collecting signal S8 is sent out, collected IC-card 32D is gathered in the apparatus downwardly, as described before (step ST16). If receiving signal S12 from host controller HC is sent out to the apparatus controller MC (step ST21), the IC card 32 will be inserted into the inside of apparatus from receiving frame 23 (step ST22). Consequently, if the IC card 32 is inserted, controller MC will drive motor 38 with the reverse rotation (step ST23). IC card 32 is connected to connector 22 by the reverse rotation of motor 38, and the leading edge of connector 22 makes switch MS go to ON. If switch MS is turned ON, apparatus controller MC sends out the connection signal S5 to host controller HC (step ST24). In this way, the IC card 32 rests in the condition of having connected with the connector 22. The communication is performed between host controller HC and IC card 32 (step ST25). As the results, IC card 32 rests in the condition of being connected with the connector 22. The data communication is performed by host controller HC. When communication with controller HC and IC card 32 is performed, the issue signal S6 sends out to supplement controller MC from the controller HC (step ST27). If the issue signal S6 is sent, supplement controller MC will rotate motor 38 forward via the drive circuit MD (step ST28). Consequently, IC card 32 reaches receiving frame 23. Therefore, the extraction preparation by hand is completed, as described before (step ST29). At this time, the detecting signal S3 of sensor RS is sent out to the supplement control MC. And the completion signal S7 is further sent out from the supplement controller MC (step ST30). If the IC card 32 is pulled out from receiving frame 23, the completion signal S7 is not sent. Therefore, the entire apparatus returns to the original condition (steps ST31 and ST32). When the communication with host controller HC and IC card 32 is not successful, the IC card 32 is collected. At this time, the collecting signal S8 is sent out to the supplement controller MC from the main controller HC (step ST33). If the collecting signal S8 is sent, collected IC-card 32D is gathered in the apparatus downwardly, as described before (step ST34).

A second embodiment according to the invention o is shown in FIGS. 21–27. Identical or similar components have the same reference number as that used in describing the embodiment of FIGS. 1–16 and 18–20.

Figure 21:
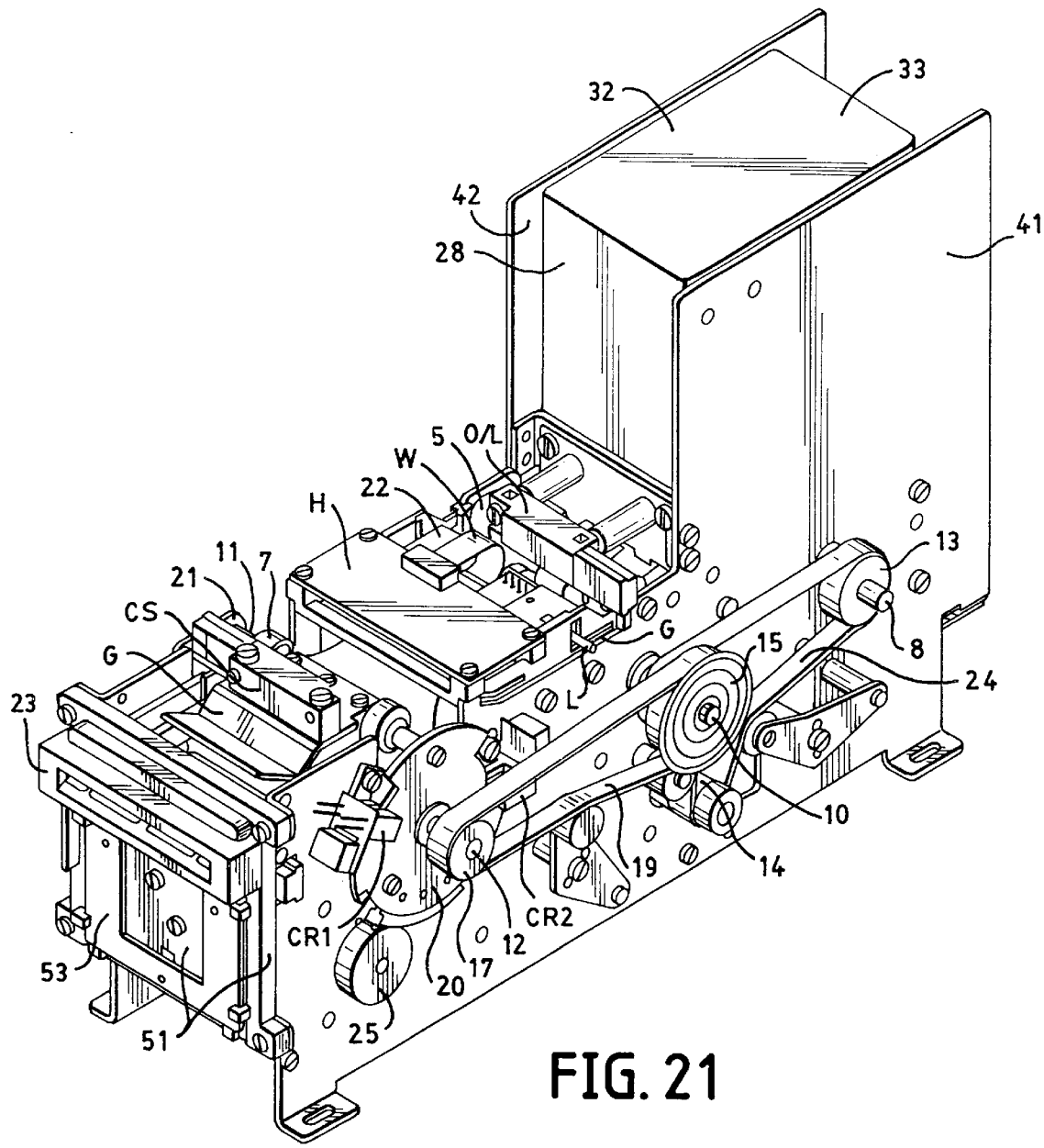
FIG. 21 is a sketchy perspective view showing one embodiment according to this invention.

In FIG. 21, a pair of large L-shaped boards or sideboards 41 and 42 are shown. The upper-right part between the sideboards 41 and 42 contains a stack 28. The stack 28 accumulates many IC cards 32 in the shape of a pillar. The IC card 32 has an embedded thin integrated circuit chip. A pad 33 for connecting the IC chip is formed on the surface of IC card 32. The number of pads 33 is again eight (the number of pads 33 may be varied).

Figure 22:
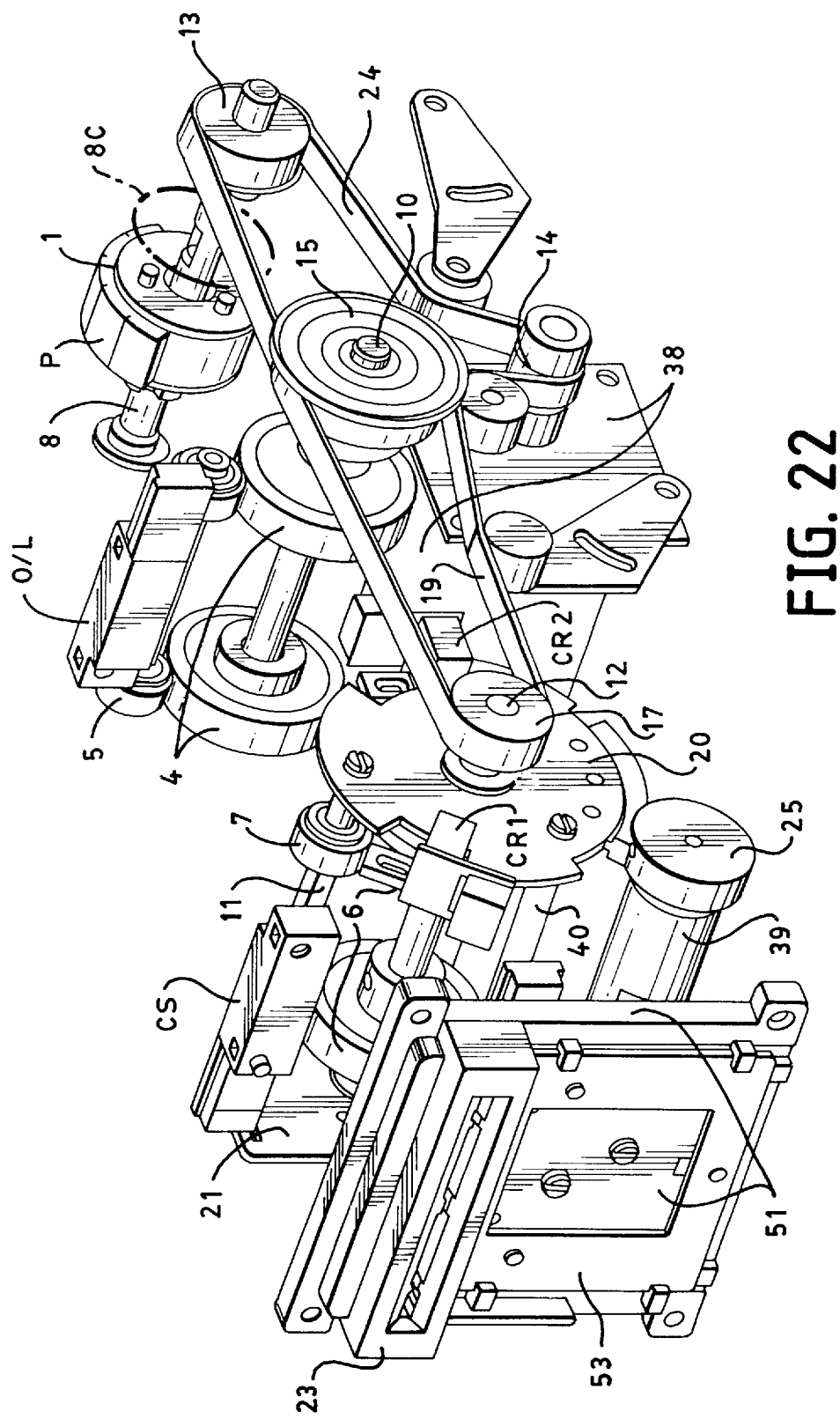
FIG. 22 is a some principal parts perspective view showing the embodiment after removing a part of FIG. 21.
Figure 23:
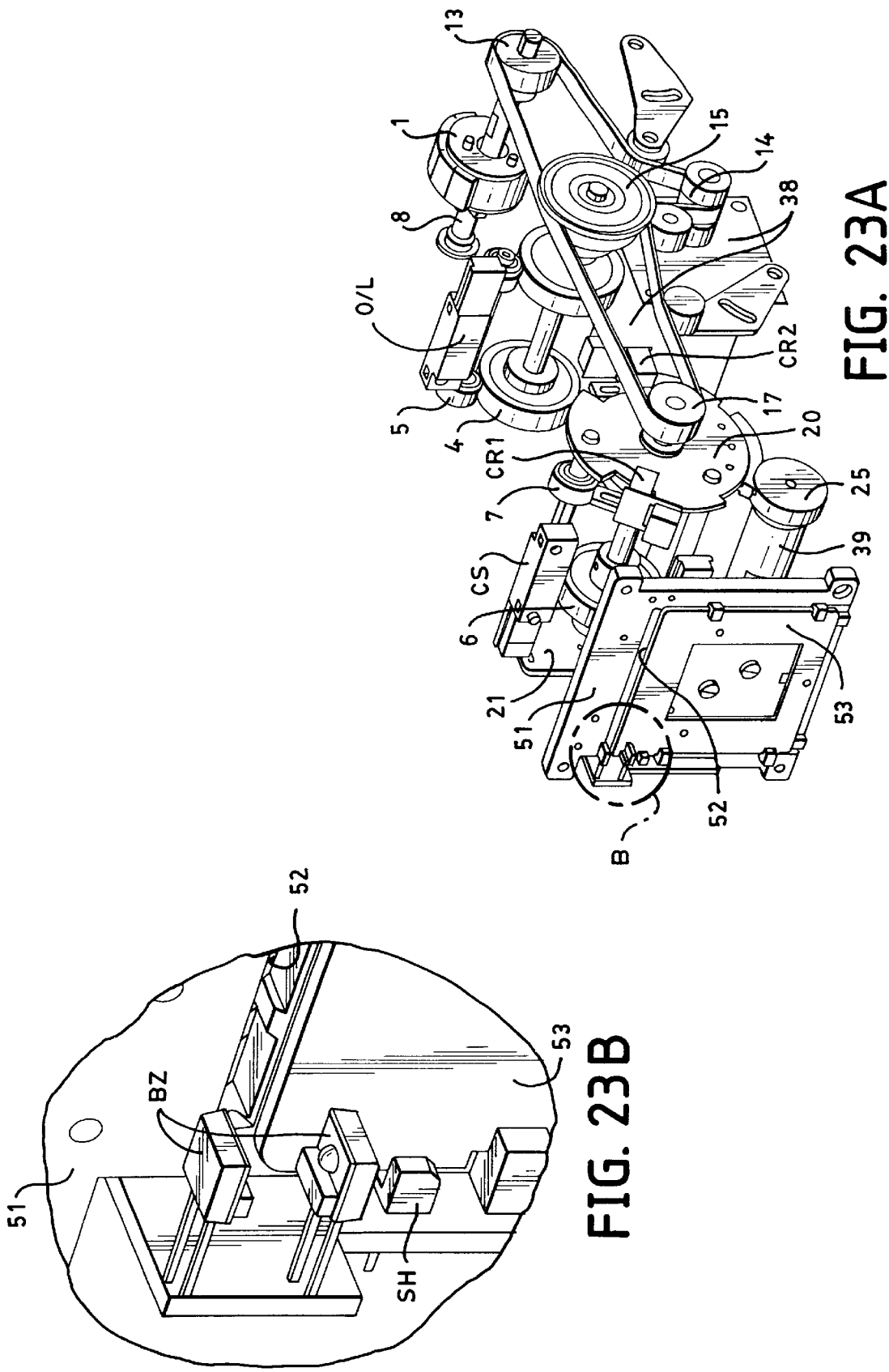
FIG. 23A is an enlarged perspective view showing particular parts of the embodiment after extracting a principal part of FIG. 22.
FIG. 23B is perspective view showing some principal parts of the embodiment after extracting a principal part of FIG. 22.
Figure 24:
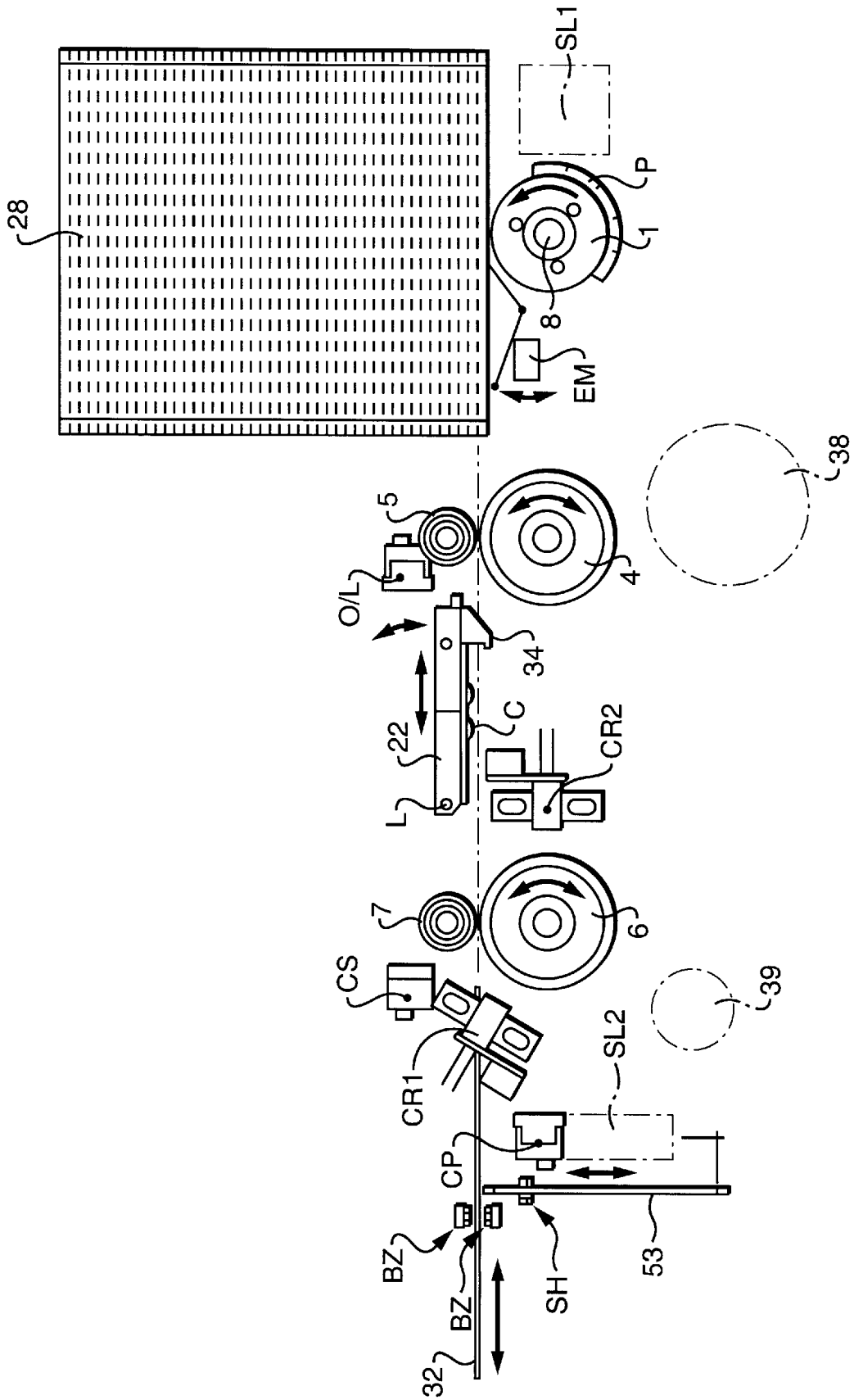
FIG. 24 is side view showing some parts of the embodiment after extracting principal parts of FIG. 21.

Between the sideboards 41 and 42, an electric motor 38 with gear is built in. The electric motor 38 is used in order to draw an IC card 32 (see FIG. 22). The rotation shaft which is an output shaft of the electric motor 38 supports the pulley 14. The symbol 1 shown at the upper right of FIG. 22 is a roller for sending out IC card 32. The roller 1 is installed rotatably on a shaft 8, and it has a clutch mechanism at the side thereof. The shaft 8 is provided with a clutch 8C (see FIG. 22) of a pulley type with a groove. The clutch 8C performs the same movement as the shaft 8. The clutch 8C can be coupled with the roller 1 freely, by operation of a solenoid SL1 (see FIG. 24) via the arm (not shown) which can fit into the groove. The end part of shaft 8 installs a pulley 13. A sensor EM, which is arranged near the roller 1, detects that the IC card 32 was lost (see FIG. 4). That is, the sensor EM which detects the empty of IC card detects a pendulum which runs by weight when the stack 28 is lost. A pair of rollers 4 are arranged near the roller 1 for sending out (issuing) an IC card 32 from under the stack 28 (see FIG. 22). In addition, the roller 4 for sending out the IC card 32 which is drawn out, is rotatably arranged on the apparatus via a long shaft 10. A pulley 15 with step is installed on the right-end part of shaft 10.

On the roller 4 for drawing the IC card, small idlers 5 for pushing the IC card are arranged rotatably, respectively. A belt 24 is spans the pulley 14 of electric motor 38 of the drive source, at the pulley 13, and at the small-diameter part of pulley 15.

The symbol 17 shown in the center left of FIG. 22 is a pulley. A belt 19 spans the pulley 15 and the large-diameter part of pulley 17. The pulley 17 is installed on the edge part of shaft 12. At the center of shaft 12, a pair of rollers 6 for moving the IC card 32 are installed.

A large diameter gear board 20 is rotatably installed on the shaft 12 at the pulley 17 side. On the other-end part of shaft 12, a rectangle board flange 21 is rotatably installed. Further, the gear board 20 and flange 21, which become a pair, are respectively arranged on the exterior of the sideboards 41 and 42 (see FIG. 21). Moreover, a shaft 11 is fixed between the gear board 20 and flange 21. On the shaft 11, a pair of small idlers 7 for suppressing the IC card 32 are rotate-ably installed, corresponding to a pair of rollers 6. Rods 40, for reinforcement, are coupled between the gear board 20 and flange 21 (see FIG. 22).

The shaft 11, a guide G which a rectangle board is bent is attached (see FIG. 21). Further, the guide G guides the IC card 32 on the roller 6 from a receiving frame 23. The small electric motor 39 (see lower left of FIG. 22) is a drive source for collecting the IC cards 32 of inferior quality inside the apparatus, for example.

A pinion 25 is installed on the rotation shaft of electric motor 39. The pinion 25 meshes with the gear board 20 of large diameter. A rectangular cover plate 51 is fixed between the left ends of side boards 41 and 42 (see FIG. 21). At the upper part of cover plate 51, an oblong slit 52 which passes an IC card 32 is provided (see FIG. 3). Furthermore, on the outside surface of cover plate 51, a square-ring shaped shutter 53 is arranged in vertically movable via spring (not shown). The shutter 53 opens and closes a slit 52 for passing the IC card 32. At the upper part of cover plate 51, the receiving frame 23 of oblong square-ring type is fixed. The receiving frame 23 guides the apparatus with the IC card 32 inserted into the apparatus. The oblong the rectangular-shaped member in FIG. 21 is a housing H.

Within the housing H, a connector 22 for IC-card 32 is movably contained. The connector 22 of board shape is contained within housing H slidably in a substantially horizontal direction and rotatably upward (see FIG. 4). Concretely, two small grooves G are formed in each side of housing H (see FIG. 21). Each small groove G at the side of stack 28 is about L shape. Each small groove G at the side of receiving frame 23 is of an I shape. The connector 22 has a plurality of small protrusions L on each side (see FIG. 4). Each protrusion L at the side of stack 28 is relatively long. Each protrusion L at the side of shutter 53 is relatively short. On the outer end of long protrusion L, a spring (not shown) for returning the connector 22 is hooked. On the undersurface of connector 22 and on each angular part at the side of stack 23, a pair of small hooks 34 are respectively formed (see FIG. 4). These hooks 34 hook both angular parts of one end of the IC card 32. The eight contacts C are arranged at the undersurface of connector 22 (see FIG. 4). The contacts C are connected to the upper part of housing H via flexible wires W (see FIG. 21).

Figure 25:
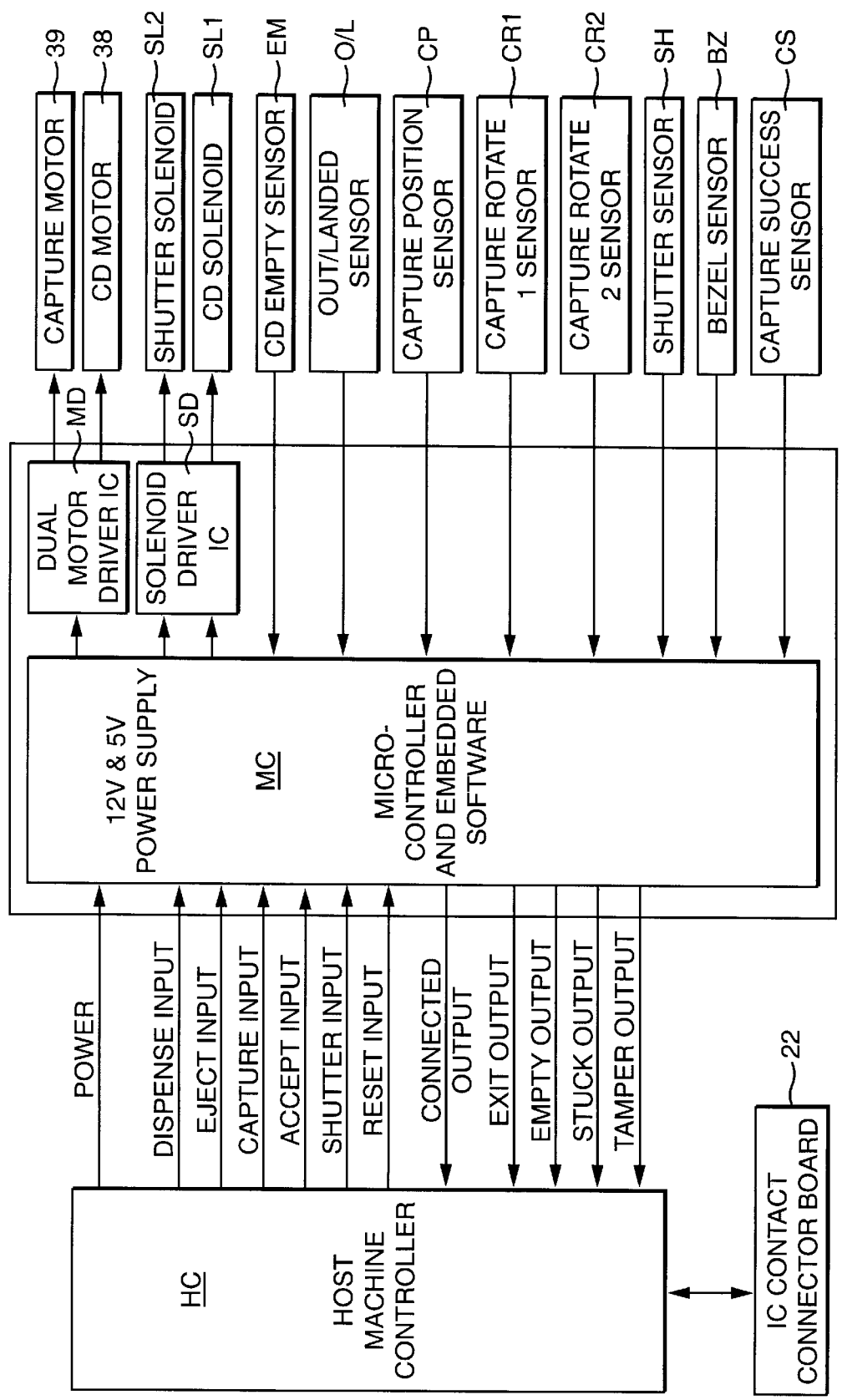
FIG. 25 is a block circuit diagram, which is used in the embodiment of FIG. 21.
Figure 26:
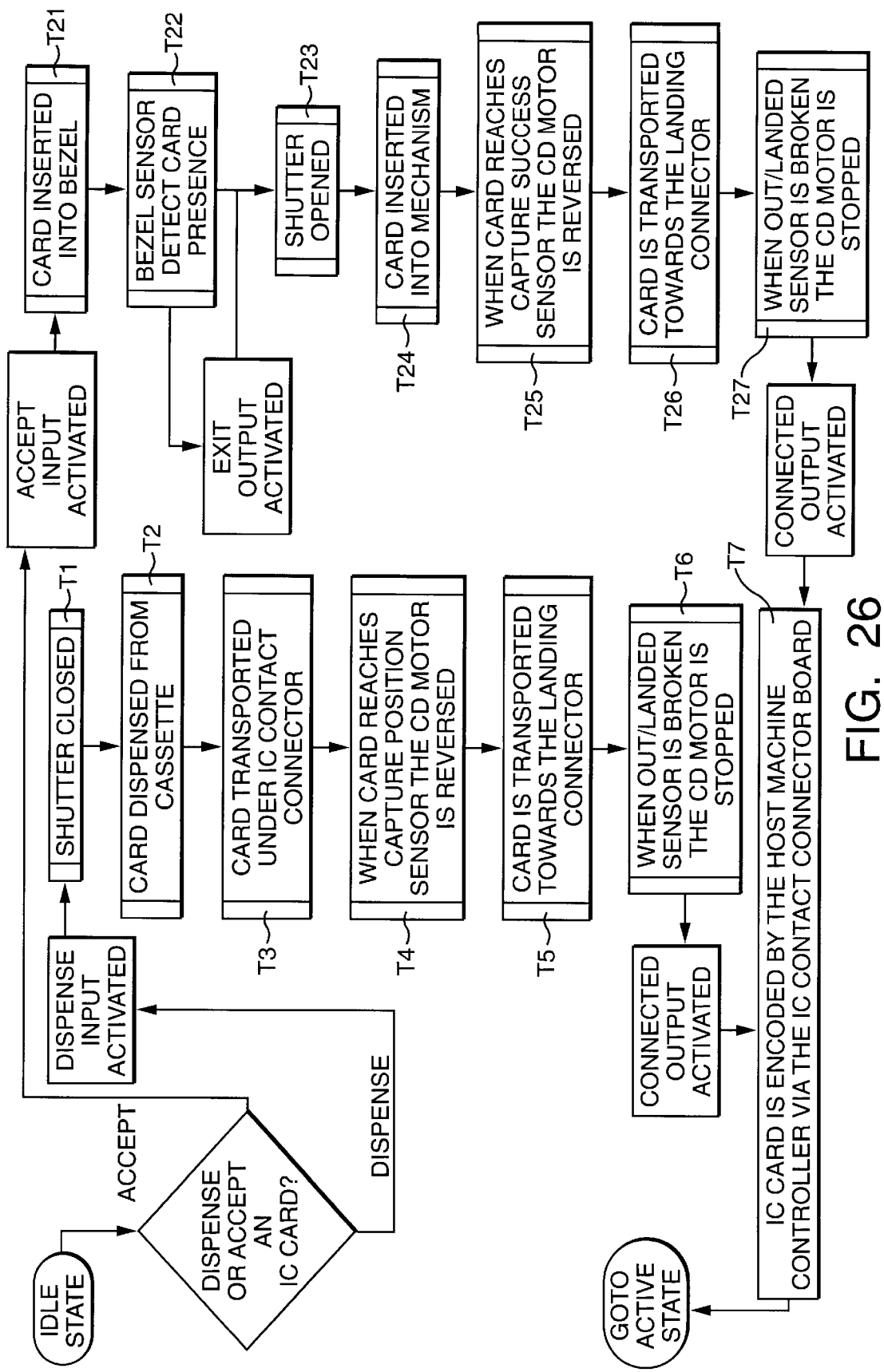
FIG. 26 is a flowchart for explaining an operation of the embodiment of FIG. 21.
Figure 27:
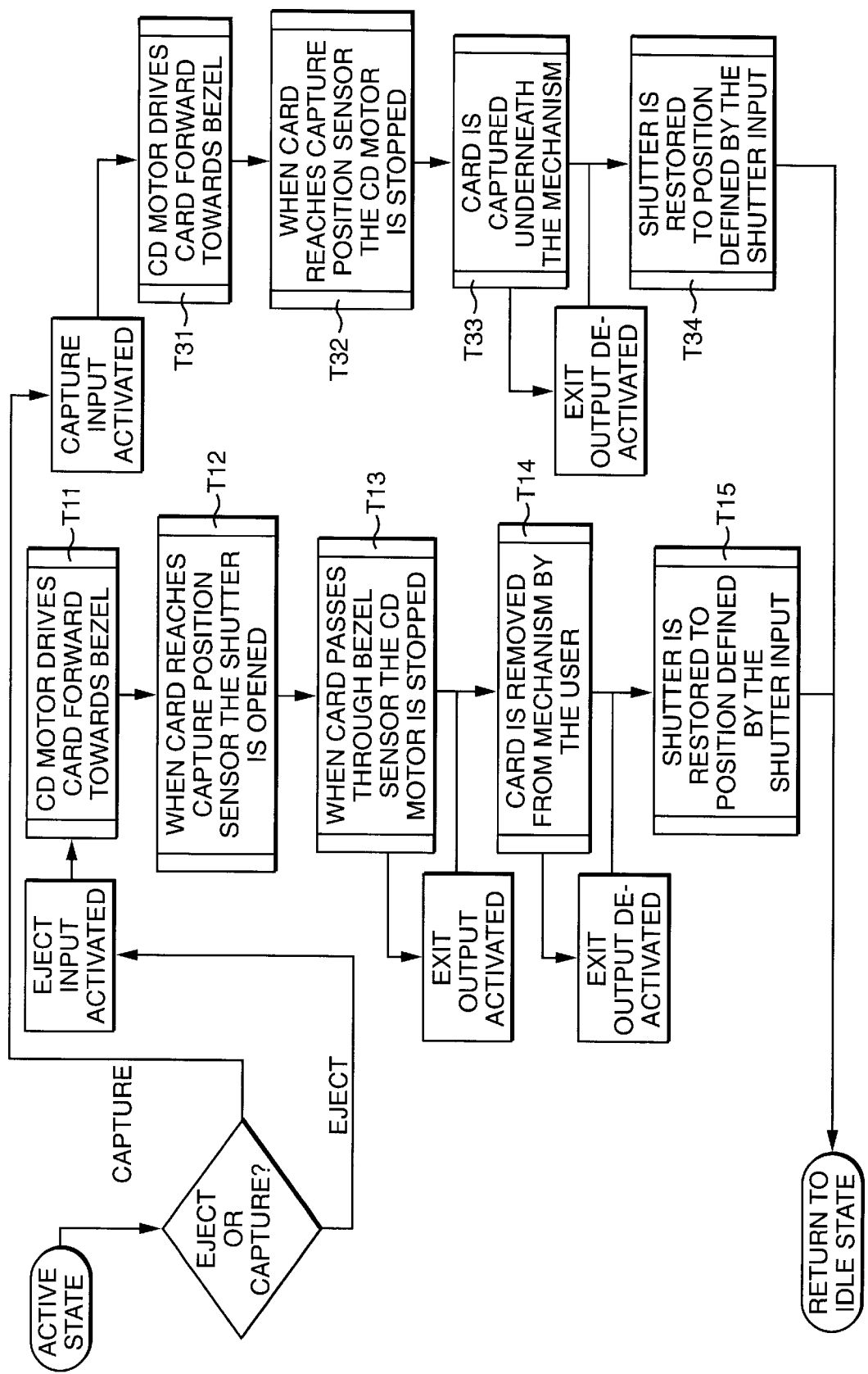
FIG. 27 is also a flowchart for explaining the operation of the embodiment of FIG.21.

FIG. 25 is a block circuit diagram of the example shown in FIG. 21. The symbol HC shown in the left of FIG. 25 is a controller of host machine (not shown). The MC in FIG. 25 connected to the host controller HC is a controller of the apparatus of the embodiment of FIG. 21. The controller MC connects the electric motor, the solenoid, and the sensors shown in FIG. 4, respectively. Only the connector 22 is connected to the host controller HC. The electric motors 38 and 39 respectively perform forward and reverse rotations via a drive circuit MD. Moreover, solenoids SL1 and SL2 are respectively operated via a drive circuit SD.

Figure 6:
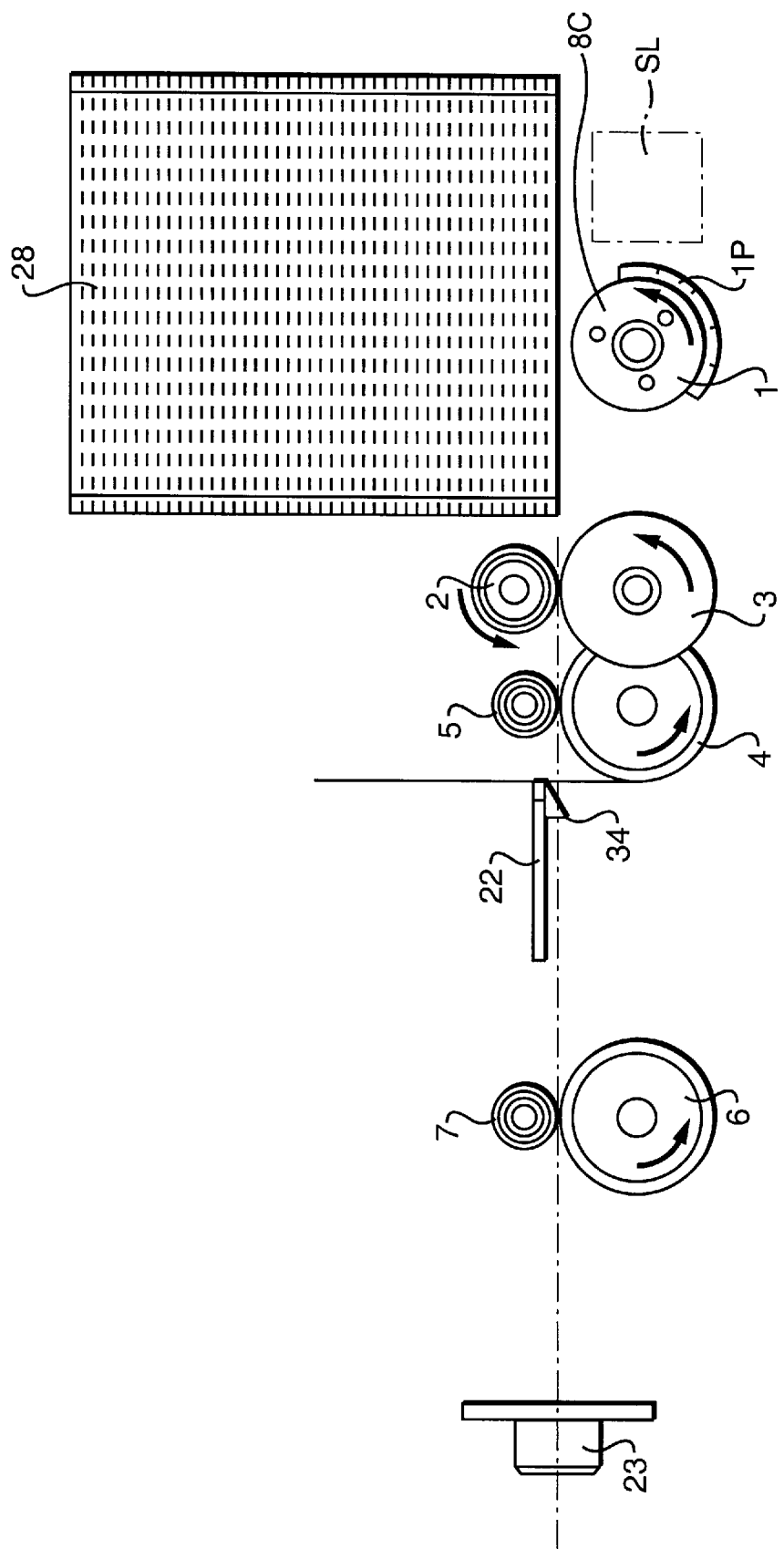
FIG. 6 is a schematic diagram showing operation characteristics of this embodiment.
Figure 7:
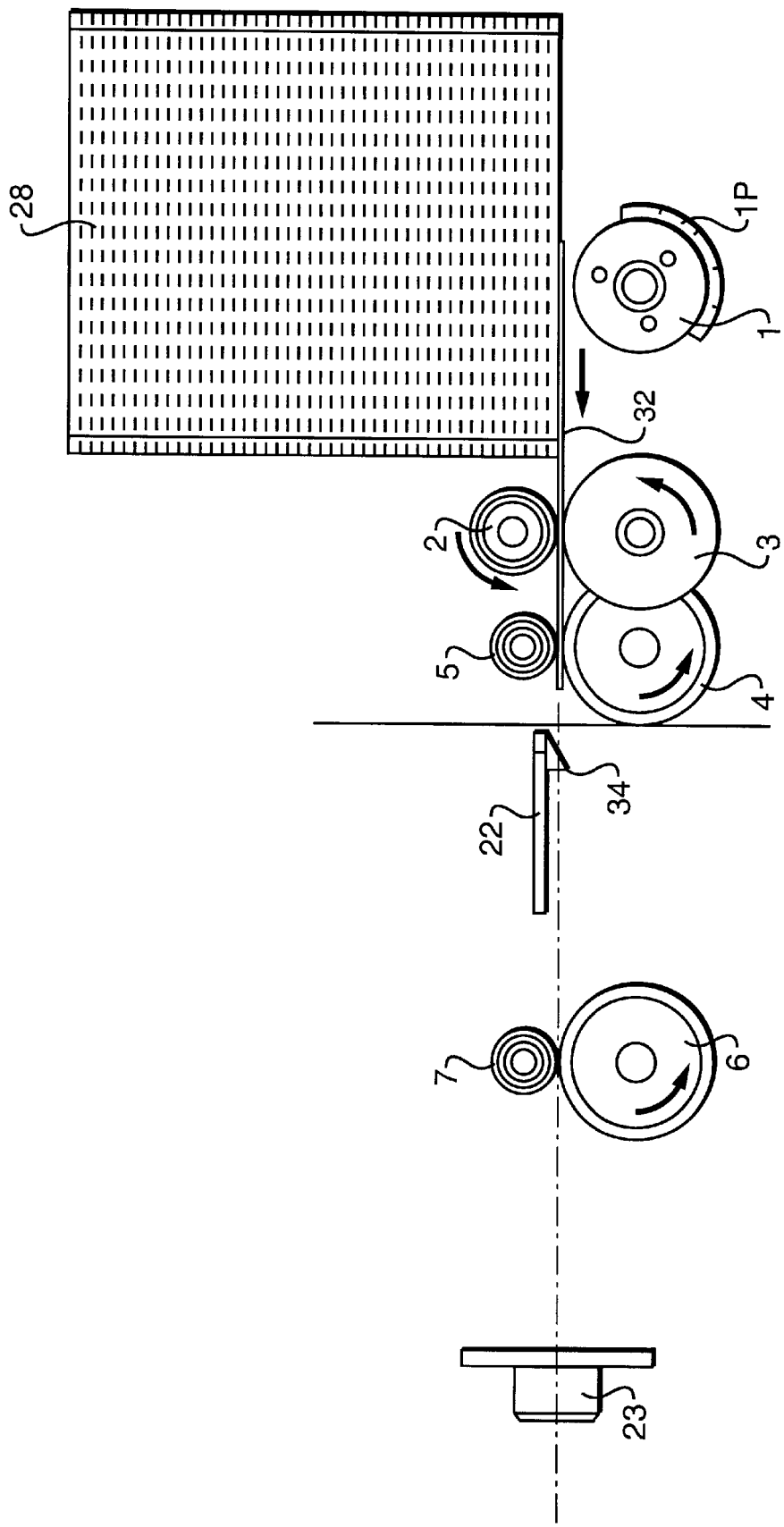
FIG. 7 is a schematic diagram showing operation characteristics of this embodiment.
Figure 8:
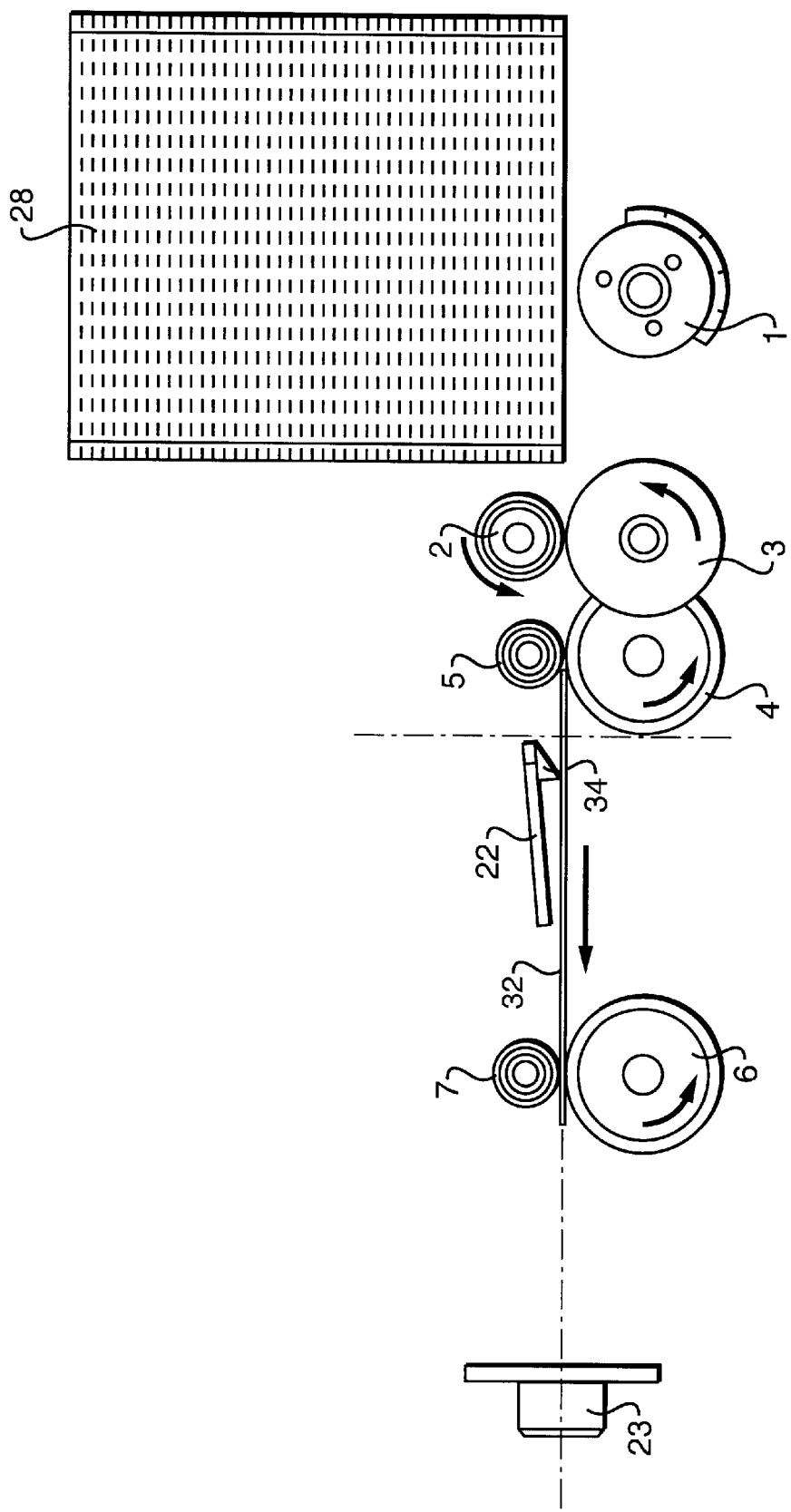
FIG. 8 is a schematic diagram showing operation characteristics of this embodiment.

The operation of the embodiment of FIG. 21 is explained based on FIGS. 6 and 7. If a send-out signal from host controller HC to IC card 32 is sent out, solenoid SL2 will operate. The shutter 53 closes the slit 52 (step Tl). The electric motor 38 performs the forward rotation, and the pulley 14 rotates. The pulley 15 and the pulley 13 respectively rotate via the belt 24. On the other hand, solenoid SL1 operates, and the roller 1 rotates via clutch 8C (see FIG. 4). Consequently, IC card 32 of the most bottom of stack 28 is sent out by a little long projection P of roller I (step T2). The front end of IC card 32, which is sent out by projection P, is sent in between roller 4 and idler 5. The IC card 32 which was picked-up by rotations of roller 4 and idler 5 is further sent out in the direction of connector 22. Incidentally, solenoid SLI is turned OFF at this time. In this way, clutch 8C detaches. Roller 1 is not rotated although the shaft 8 is rotated. Therefore, the front end of the IC card 32 sent out by roller 4 and idler 5 hits the hooks 34 of connector 22 (step T3). At this time, the hooks 34 of connector 22 will be moved upwards a little against spring (see FIG. 24). Therefore, the IC card progresses and the front end of the IC card 32 is picked-up by the rotations of roller 6 and idler 7. The IC card 32, which was picked-up, is sent out in the direction of shutter 53 by only roller 6 and idler 7. If the IC card 32 passes hooks 34 and the front end is detected by a position sensor CP, the reverse rotation of electric motor 38 will be performed (step T4). The reverse rotations of roller 6 and idler 7 are performed by the reverse rotation of electric motor 38, and the IC card 32 is returned in the direction of hook 34 (step T5). If the returned IC card 32 strikes hooks 34, the connector 22 will be moved at the direction of stack 28 and in nearly diagonal downward against spring (see FIG. 4). Consequently, the pads 33 of IC card 32 contact to the contacts C of connector 22. The leading edge of connector 22 is detected by a sensor O/L simultaneously. If the detection is confirmed, the rotation of roller 6, i.e., electric motor 38 is stopped (step T6).

In the meantime, the detection signal of sensor O/L is sent out to the host controller HC via controller MC. It is confirmed that the pads 33 of the IC card 32 are in contact with the contacts C of connector 22. The data processing in IC card 32 is performed in this condition (step T7). The connector 22, the chip (not shown) in the IC card 32 is written to and read out from as data by the controller HC. If the data communication of main controller HC and IC cards 32 is completed successfully, a signal will be sent out from controller HC to supplement controller MC. If the signal is output, the supplemental controller MC will signal for forward rotation of electric motor 38 via the drive circuit MD. Consequently, the IC card 32 is again sent at the direction of shutter 53 by roller 6 and idler 7 (step T11). The connector 22 is returned to the original position by spring (not shown) at this time. If the IC card 32 sent in the direction of shutter 53 is detected by sensor CP, shutter 53 will be opened via solenoid SL2 (step T12). When IC card 32 passes a slit 52 and is detected by sensor BZ, the electric motor 38 is stopped (step T13). In this condition, if the IC card 32 is pulled out by fingers from receiving frame 23, a sensor BZ will be operated also (step T14). For example, shutter 53 closes slit 52 (step T15). Still, the above-mentioned process is performed by the program of controllers HC and MC.

The case where the IC card 32 is inserted within the apparatus from the receiving frame 23 is step T21. The front end of IC card 32 is detected by sensor BZ (step T22), the shutter 53 is opened (Step T23). In this way, the IC card 32 is inserted within the apparatus through the slit 52 (step T24). If the inserted IC card 32 is detected by a sensor CS for confirming the acceptance, the electric motor 38 will perform the reverse rotation (step T25). The reverse rotations of roller 6 and idler 7 are performed by the reverse rotation of electric motor 38. The picked-up IC card 32 is sent at the direction of hook 34 (step T26). When the IC card 32 strikes hooks 34, connector 22 is moved in the direction of stack 28 and in the direction of nearly lower diagonal against spring (see FIG. 4). Consequently, the pads 33 of IC card 32 make contact with the contacts C of connector 22. The leading edge of connector 22 is detected by sensor O/L simultaneously. When the detection is confirmed, the rotation of roller 6, i.e., electric motor 38 is stopped (step T27). In this way, the data processing in the IC card 32 is performed (step T7). The process of steps T11 to T15 is performed as described above, for example. When the communication with host controller HC and IC card 32 is not performed, the IC cards 32 are collected. In this case, the IC card 32 is an article of inferior quality, or the stack orientation of IC cards 32 are not suitable, or the head and tail surfaces of IC card 32 is reverse at the stack.

In this case, a collecting signal is sent out to supplement control MC from main control HC. If a collecting signal is given out, the forward rotation of motor 38 will be initiated by controller MC. Consequently, collected IC card 32 is sent out at the direction of receiving frame 23 by roller 6 and idler 7 (step T31). When the collected IC card 32 is sent out in the direction of receiving frame 23 and the front end is detected by position sensor CP, the electric motor 38 is stopped (step T32).

Almost simultaneously, the electric motor 39 actuated by controller MC, and a pinion 25 performs the forward rotation about shaft 12 by the gear 20. Consequently, a shaft 11 of idler 7 rotates about roller 6. Since the IC card 32 is pinched into the roller 6 and idler 7, the IC card 32 is inclined about 40 degrees from the horizontal condition (not shown). At this time, a sensor CR2 detects an edge notch of gear 20, and the rotation of electric motor 39 is stopped. Almost simultaneously, the rotation of electric motor 38 is reversed, and the rotation of roller 6 is reversed. The collected IC card 32 is collected at the downward portion in drawings (step T33). After this, the rotation of electric motor 39 is reversed, and gear 20, namely, idler 7. is returned to the original position via pinion 25. If the idler 7 is returned to original position, sensor CRI will detect the edge notch of gear 20, in the direction of a stack 28. When the sensor CR1 detects the notch, the rotation of electric motor 39 stops. The device returns to the original condition. After this, shutter 53 closes slit 52 (step T34). In addition, a sensor SH of shutter 53 detects the opening and closing operation of shutter 53. Furthermore, it is of course that the sensor O/L detects whether the IC card 32 is discharged from the stack 28.

The invention as described above adds an apparatus to a simple structure, which can draw a card one by one reliably. As a result, the invention can data-process and issue IC cards. In addition, the invention has an advantage, which an IC card inserted from the exterior of apparatus is data-processed and can be issued again. Further, this invention has another advantage, which stores several sheets of blank IC cards and it can issue the IC card. Further, the invention has the other advantage that it can collect the IC card, if the configuration of IC card is wrong, for example.

While specific embodiments of the invention have been shown and described in detail to illustrate the application of the principles of the invention, it will be understood that the invention may be embodied otherwise without departing from such principles.

What is claimed is:

1. An apparatus for issuing an integrated circuit (IC) card, the apparatus comprising:

a housing defining a card opening for one of receiving and discharging the IC card;

connector means in said housing for connecting to the IC card and performing data processing on the IC card;

transfer means arranged between said card opening and said connector means, said transfer means including a roller and an idler, said idler holding the IC card against said roller for transferring the IC card between said card opening and said connector means, said idler being mounted on an idler shaft rotatable about a rotation axis of said roller to transfer the IC card to a collecting position.

2. An apparatus in accordance with claim 1, further comprising:

stack means in said housing for establishing a stack of the IC cards;

drawing means for drawing one of the IC cards away from the stack.

3. An apparatus in accordance with claim 2, wherein:

said drawing means draws only the one IC card from either a bottom most position of said stack or at an exterior position of said stack.

4. An apparatus in accordance with claim 2, further comprising:

a shutter mechanism for opening and closing said card opening, said shutter mechanism detecting the IC card inserted from outside of said housing and accepting the IC card into said housing, said shutter mechanism detecting the IC card moved by said transfer means to said card opening, said shutter mechanism opens said card opening for passage of the IC card when said shutter mechanism detects the IC card at said card opening;

said collecting position is inside the housing;

said transfer means includes collecting means for collecting the IC card at said collecting position;

said drawing means draws only the one IC card from either a bottom most position of said stack or at an exterior position of said stack.

5. An apparatus in accordance with claim 1, further comprising:

a shutter mechanism for opening and closing said card opening.

6. An apparatus in accordance with claim 5, wherein:

said shutter mechanism detects the IC card inserted from outside of said housing and accepting the IC card into said housing.

7. An apparatus in accordance with claim 5, wherein:

said shutter mechanism detects the IC card moved by said transfer means to said card opening, said shutter mechanism opens said card opening for passage of the IC card when said shutter mechanism detects the IC card at said card opening.

8. An apparatus in accordance with claim 1, wherein:

said collecting position is inside the housing;

said transfer means includes collecting means for collecting the IC card at said collecting position.

9. A apparatus in accordance with claim 1, wherein:

said idler rotates about said idler shaft and said roller rotates about said rotation axis of said roller to transfer the IC card between said card opening and said connector means.

10. A apparatus in accordance with claim 1, wherein:

said transfer means selectively transfers the IC card back and forth between said card opening and said connector means.

11. An apparatus for issuing an integrated circuit (IC) card, the apparatus comprising:

a housing defining a card opening for one of receiving and discharging the IC card;

a connector in said housing for connecting to the IC card and performing data processing on the IC card;

a transfer device arranged between said card opening and said connector, said transfer device including a roller rotating about a roller axis and an idler rotating about an idler shaft, said idler holding the IC card against said roller, said idler rotating about said roller axis of roller to transfer the IC card between a first and second position, said idler rotating about said idler shaft and said roller rotating about said roller axis to transfer the IC card between said card opening and said connector when the IC card is in said first position, said idler rotating about said idler shaft and said roller rotating about said roller axis to transfer the IC card from said transfer device to a collecting position when the IC card is in said second position.

* * * * *